(12) United States Patent
Rimchala et al.

(10) Patent No.: US 12,694,210 B2
(45) Date of Patent: Jul. 28, 2026

(54) MULTILINGUAL, CONTEXT-AWARE MACHINE LEARNING MODEL CONFIGURED FOR PROFANITY DETECTION AND MITIGATION

(71) Applicant: Intuit, Inc., Mountain View, CA (US)

(72) Inventors: Tharathorn Rimchala, San Francisco, CA (US); Hector Carrillo, Mountain View, CA (US); Runhua Zhao, San Jose, CA (US); Tin Nguyen, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 157 days.

(21) Appl. No.: 18/589,151

(22) Filed: Feb. 27, 2024

(65) Prior Publication Data

US 2025/0272489 A1     Aug. 28, 2025

(51) Int. Cl.
    *G06F 40/284*       (2020.01)
    *G06F 40/51*       (2020.01)
    *G06F 40/58*       (2020.01)

(52) U.S. Cl.
    CPC ............ *G06F 40/284* (2020.01); *G06F 40/51* (2020.01); *G06F 40/58* (2020.01)

(58) Field of Classification Search
    CPC ......... G06F 40/284; G06F 40/58; G06F 40/51
    See application file for complete search history.

(56) References Cited

U.S. PATENT DOCUMENTS

2022/0284884 A1*   9/2022   Tongya .................. G06F 40/35

* cited by examiner

*Primary Examiner* — Bhavesh M Mehta
*Assistant Examiner* — Edward Tracy, Jr.
(74) *Attorney, Agent, or Firm* — Dinsmore & Shohl LLP

(57) ABSTRACT

Certain aspects of the disclosure relate to profanity detection and mitigation. A method generally includes training a machine learning (ML) model using labeled training data instances by, for each training data instance: providing the tokens of the respective training data instance to an input layer of the ML model; receiving a first output for each token of the respective training data instance classifying the respective token as a profanity-containing or a non-profanity-containing token; receiving a second output for the respective training data instance classifying the respective training data instance as a profanity-containing or a non-profanity-containing instance; determining a loss value based on the first output for each token and the second output using a loss function comprising a regularization term configured to increase loss based on disagreement between the first output for each token and the second output; and modifying parameter(s) of the ML model based on the loss value.

20 Claims, 8 Drawing Sheets

100 ⌐

Datastore 102

Training Data Instance 104

⌐ 106

Training for Profanity Detection and Mitigation

Dataset Generation and Labeling 110

Training 112

⌐ 114

Profanity Detection and Mitigation

Sentence-Level Profanity Classification 116

⌐ 117
Profanity-Containing Instance?

No

Yes

Token-Level Profanity Classification 118

Concealing 120

Downstream Task(s) / Downstream Application(s)

500

A Method For Training a Machine Learning (ML) Model to Detect Profanity

502

Label each of a plurality of training data instances with a first label

504

Label each token of a plurality of tokens for each of the plurality of training data instances with a second label

506

Train the ML model by, for each training data instance of the plurality of training data instances:

508

Provide the plurality of tokens of the respective training data instance to an input layer of the ML model

510

Receive a first output for each of the plurality of tokens of the respective training data instance classifying the respective token as a profanity-containing token or a non-profanity-containing token

512

Receive a second output for the respective training data instance classifying the respective training data instance as a profanity-containing instance or a non-profanity-containing instance

514

Determine a loss value based on the first output for each of the plurality of tokens and the second output using a loss function comprising a regularization term configured to increase loss based on disagreement between the first output for each of the plurality of tokens and the second output

516

Modify one or more parameters of the ML model based on the loss value

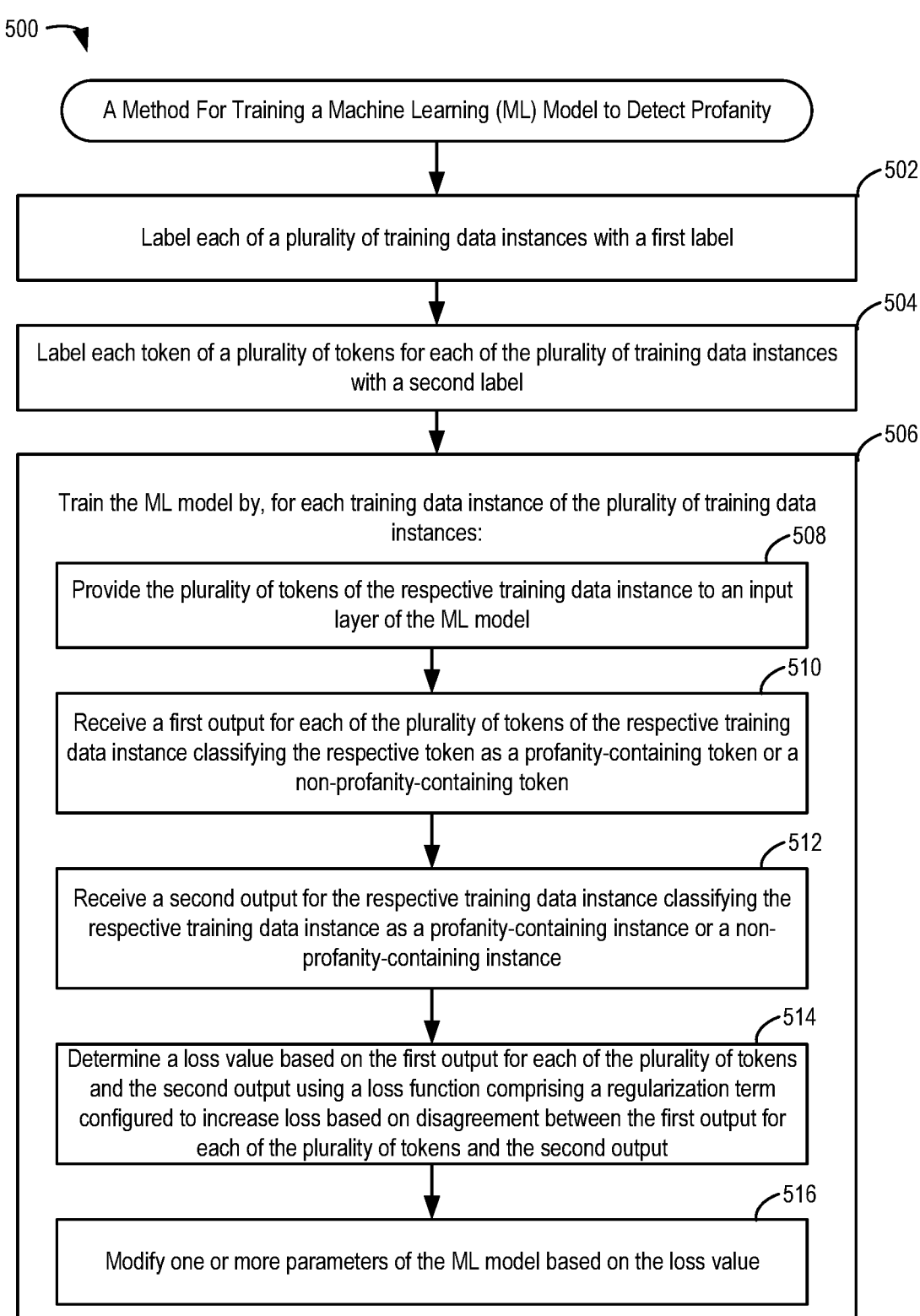

*FIG. 5*

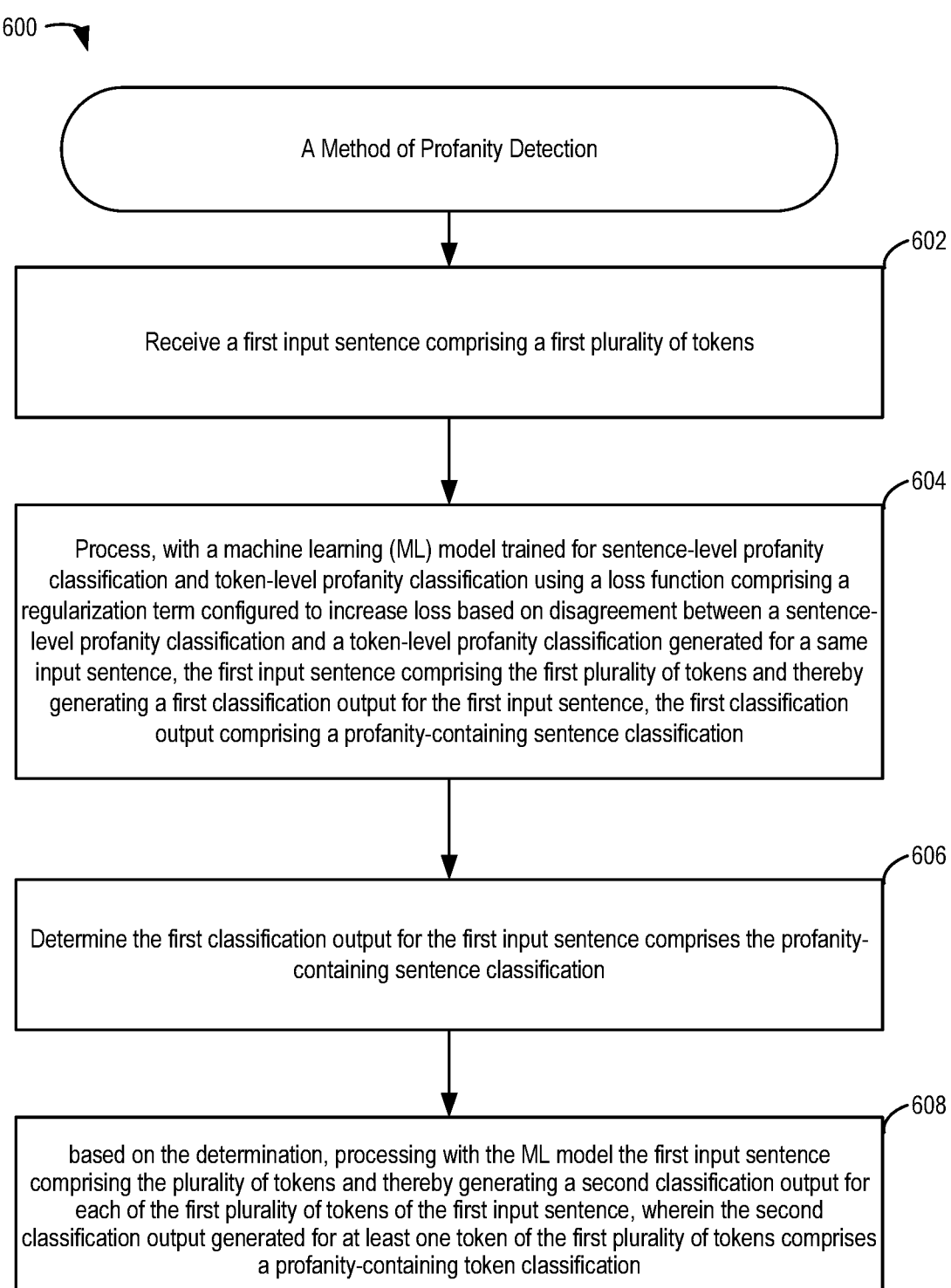

600

A Method of Profanity Detection

602

Receive a first input sentence comprising a first plurality of tokens

604

Process, with a machine learning (ML) model trained for sentence-level profanity classification and token-level profanity classification using a loss function comprising a regularization term configured to increase loss based on disagreement between a sentence-level profanity classification and a token-level profanity classification generated for a same input sentence, the first input sentence comprising the first plurality of tokens and thereby generating a first classification output for the first input sentence, the first classification output comprising a profanity-containing sentence classification

606

Determine the first classification output for the first input sentence comprises the profanity-containing sentence classification

608 based on the determination, processing with the ML model the first input sentence comprising the plurality of tokens and thereby generating a second classification output for each of the first plurality of tokens of the first input sentence, wherein the second classification output generated for at least one token of the first plurality of tokens comprises a profanity-containing token classification

*FIG. 6*

MULTILINGUAL, CONTEXT-AWARE MACHINE LEARNING MODEL CONFIGURED FOR PROFANITY DETECTION AND MITIGATION

BACKGROUND

Field

Aspects of the present disclosure relate to profanity detection and mitigation using machine learning.

Description of Related Art

A key long-term goal of artificial intelligence (AI) is to create machines capable of understanding and engaging in conversation with humans using natural language. Dialogue systems, which can communicate with users in natural language, can assist users in completing a myriad of tasks, such as making reservations (e.g., task-oriented systems) and/or carrying out unstructured conversations on any topic (e.g., open-domain systems).

One example dialogue system is a large language model (LLM)-based system. LLMs have demonstrated notable performance for a variety of natural language processing (NLP) tasks. In particular, an LLM is a type of machine learning (ML) model that supports natural language-related tasks, such as generating text, analyzing sentiments, answering prompts (e.g., specific instructions and/or requests posed in natural language) in a conversational manner, translating text from one language to another, etc. LLMs make it possible for software to "understand" typical human speech or written content as input into an LLM-based dialogue system and respond to it with, in some cases, human-understandable responses through natural language generation (NLG).

A popular LLM, which has gained much recent attention, is "ChatGPT," produced by OpenAI®. Generative pre-trained transformer (GPT) models, such as ChatGPT, are a specific type of LLM based on a transformer architecture (e.g., architecture that uses an encoder-decoder structure and does not rely on recurrence and/or convolutions to generate an output), pre-trained in an unsupervised manner (e.g., it learns from data without being given explicit instructions on what to learn). GPT models analyze prompts and predict the best possible responses, to these prompts, based on their understanding of the language. In particular, the GPT models rely on the knowledge they gain after their billions, or even trillions, of parameterized artificial neurons are trained on massive datasets.

While LLMs, such as ChatGPT, represent a transformative force in many industries by enabling developers to build conversation-driven applications, these models are not without limitations. For example, a technical challenge associated with LLMs is the generation of profane content. Specifically, LLMs are trained on vast amounts of text data from the internet, and as a result, they may inadvertently learn to generate content that is profane. Profane content may include impolite, rude, insensitive, obscene, illegal, and/or otherwise offensive content, and is often recognized by many other names, such as, "bad words," "foul language," "swearing," "cursing," etc. For each language, there may exist a set of words and/or phrases that are widely recognized as profane. For example, in English, some common profane words include "sucks," "crap," "damn," etc. Use of such word(s) may lead to disrespectful, harmful, and/or inappropriate communications.

The inadvertent generation of profane content by LLMs may lead to, in some cases, negative interactions between users and LLMs and/or products implementing LLM-type functionality. Further, the generation of such content may pose a significant risk for applications that rely on LLMs for content generation, as it may lead to the dissemination of offensive and/or inappropriate content.

Another technical challenge associated with LLMs is the inability of LLMs to inherently filter profane content (e.g., words, phrases, images, etc.) received by the LLMs as user input without explicit instructions to do so. In particular, although profane content is considered rude, disrespectful, and/or inappropriate in many contexts, users may still choose to integrate it in everyday life, including in interactions with LLMs. LLMs may not be configured or trained to recognize this profane content, nor remove, mask, or replace such content with non-profane words, phrases, etc. As such, dissemination of this content may be inevitable, thereby leading to unsafe and/or uncivil use of LLMs for generative AI tasks.

SUMMARY

Certain aspects provide method of training a machine learning (ML) model to detect profanity, comprising: labeling each of a plurality of training data instances with a first label, the first label comprising a profanity-containing instance label or a non-profanity-containing instance label; labeling each token of a plurality of tokens for each of the plurality of training data instances with a second label, the second label comprising a profanity-containing token label or a non-profanity-containing token label; training the ML model by, for each training data instance of the plurality of training data instances: providing the plurality of tokens of the respective training data instance to an input layer of the ML model; receiving a first output for each of the plurality of tokens of the respective training data instance classifying the respective token as a profanity-containing token or a non-profanity-containing token; receiving a second output for the respective training data instance classifying the respective training data instance as a profanity-containing instance or a non-profanity-containing instance; determining a loss value based on the first output for each of the plurality of tokens and the second output using a loss function comprising a regularization term configured to increase loss based on disagreement between the first output for each of the plurality of tokens and the second output; and modifying one or more parameters of the ML model based on the loss value Certain aspects provide a method of profanity detection, comprising: receiving a first input sentence comprising a first plurality of tokens; and processing, with an ML model trained for sentence-level profanity classification and token-level profanity classification using a loss function comprising a regularization term configured to increase loss based on disagreement between a sentence-level profanity classification and a token-level profanity classification generated for a same input sentence, the first input sentence comprising the first plurality of tokens and thereby generating a first classification output for the first input sentence, the first classification output comprising a profanity-containing sentence classification; determining the first classification output for the first input sentence comprises the profanity-containing sentence classification; and based on the determination, processing with the ML model the first input sentence comprising the plurality of tokens and thereby generating a second classification output for each of the first plurality of tokens of the first input sentence, wherein the second classification output generated for at least one token of the first plurality of tokens comprises a profanity-containing token classification.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 5 depicts an example method for training a machine learning model to detect profanity.

FIG. 6 depicts an example method of profanity detection.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
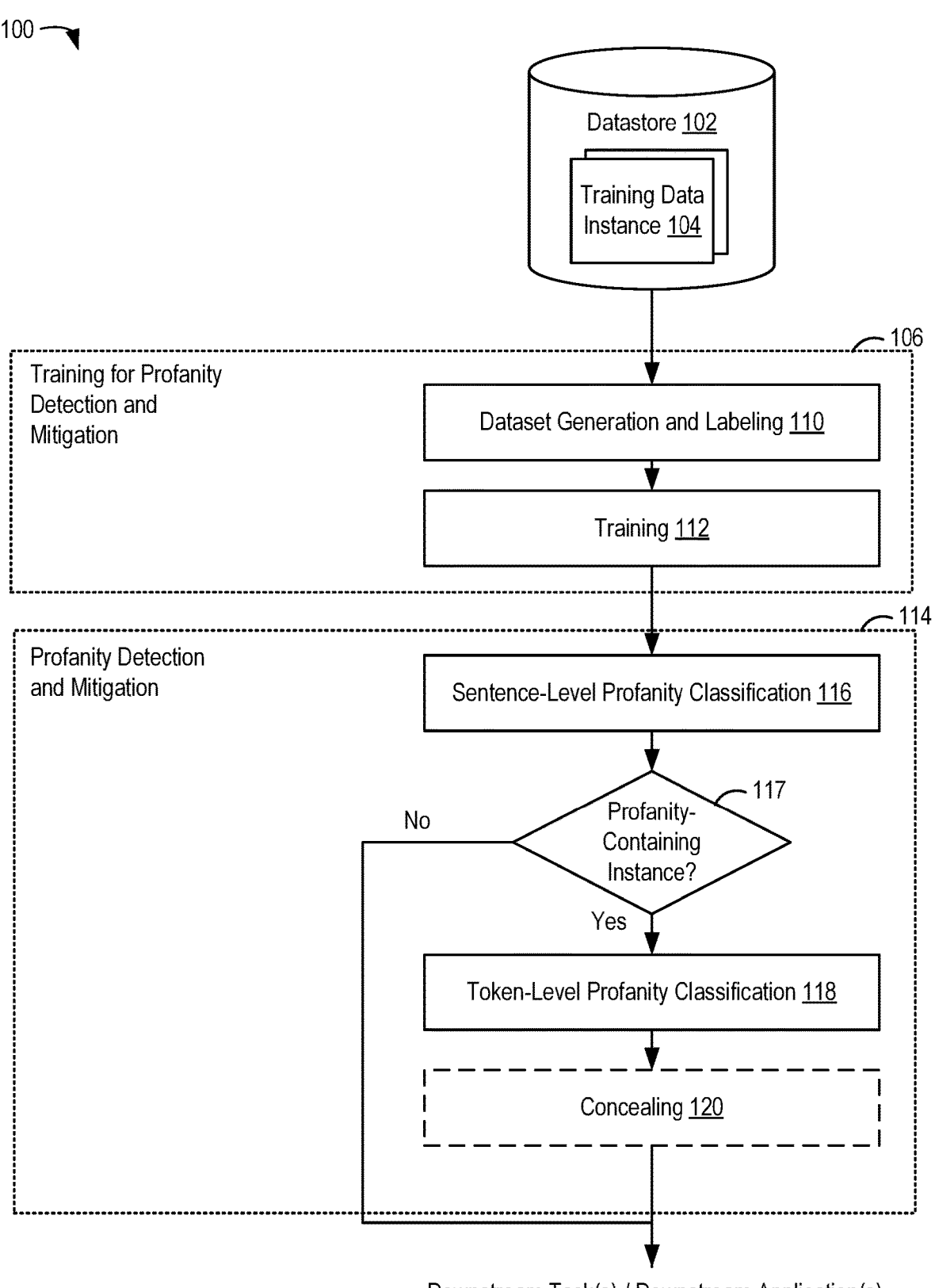
FIG. 1 depicts an example system for training and using a machine learning model for profanity detection.

To address the shortcomings of LLMs described above, some conventional approaches seek to use rule-based filtering, which relies on a set of predefined rule(s) for recognizing and handling profane content in the input and/or the output of an LLM. In particular, the LLM, or an external component interacting with the LLM, may be configured to perform rule-based filtering using "if-then" rule(s) to, for example, categorize token(s) (e.g., where a token is an individual character, word, sub-word, phrase, or even larger linguistic unit in text) of LLM input and/or output as profane. By way of example, rule-based filtering may categorize the token "sucks" in example LLM output "Company A sucks compared to Company B" as profane content based on a rule stating that "if any token included in LLM input and/or output is found within a pre-defined list of profane tokens, then that token is categorized as profane content." While using a pre-defined list of profane tokens for profanity detection provides transparency into the detection, a technical weakness of this approach includes an inability to consider the context in which the identified token is used. Assessing the context in which a token is used, e.g., in the LLM input and/or output, may be critical, in some cases, to avoid false positives (e.g., flagging something as profane when it is not).

For example, the token "sucks" is polysemic, meaning the token has multiple meanings. In a first meaning, "sucks" may mean to "draw into the mouth" such as a person sucks their straw, a baby sucks its thumb, etc. In a second meaning, "sucks" may mean "very bad, disagreeable, or disgusting." The token "sucks" may be added to the pre-defined list of profane tokens based on the second meaning of the token. Thus, when input to or output from the LLM is "the baby sucks its thumb," for example, rule-based filtering may falsely categorize the token "sucks," used in this context, as profane content, when the token "sucks," considered in light of the sentence it is used in, has no rude, disrespectful, and/or inappropriate connotation. Similar false positives may be identified for other polysemic words as well as words that gain secondary meaning through colloquial usage, such as slang.

Additionally, the amount of time needed for profanity detection and mitigation, using rule-based filtering, may be linearly related to the number of tokens included in the LLM input or output being analyzed. Thus, the more tokens included in the LLM input or output, the longer the inference time may be for detecting the profane content and responding to a user prompt (e.g., user input) since the rules must be applied token-by-token, and the rules may be numerous if the list of profane tokens is likewise long. As such, user experience with an LLM-based system may be negatively affected by the latency induced with conventional rule-based filtering methods.

Some other conventional approaches seek to overcome the aforementioned issues associated with rule-based approaches by combining LLMs with text classification ML model(s) for profanity detection. Text classification ML model(s) may be applied to the input or the output of an LLM for content moderation, and more specifically, profanity detection.

For example, in some cases, text classification ML model (s) may be trained to perform sentence-level profanity classification (e.g., where a sentence includes two or more tokens) to classify tokens included in LLM input or output as profane (or not) based on a fully-supervised trained linear classifier. In some other cases, text classification ML model (s) may be trained to perform token-level profanity classification to classify each token included in LLM input or output as profane (e.g., provide a profanity classification per token). As used herein, sentence-level profanity classification involves generating a single profanity detection prediction for two or more tokens, while token-level profanity classification involves generating a profanity detection prediction for a single token.

A technical problem associated with text classification ML model(s) trained to perform sentence-level profanity classification, is their inherent inability to also perform token-level profanity classification. Token-level profanity classification may be necessary for profanity mitigation. For example, after identifying that sentence level input or output from the LLM includes profane content, the specific token (s) in the input or output containing the profane content may need to be identified such that they can be replaced and/or masked. However, if the specific token(s) cannot be identified (e.g., token-level classification is not performed), profanity mitigation (also referred to as "profanity sanitization") may not be feasible without guessing where the profane token(s) are in the input or output or masking all tokens of the input or output (e.g., when the text classification ML model(s) are trained to only perform sentence-level profanity classification).

On the other hand, while text classification ML model(s) trained to perform token-level profanity classification are capable of carrying out profanity mitigation at the token level, the amount of time needed for token-level profanity detection is generally linearly related to the number of tokens included in the LLM input or output being analyzed. As such, similar to rule-based filtering approaches, ML model(s) trained to perform token-level profanity classification may suffer from long processing times, inducing unwanted latency into an overall process flow, and thereby negatively affecting overall user experience for a user interacting with the LLM.

While it may be feasible to train text classification ML model(s) to perform both sentence-level profanity classification and token-level profanity classification, training the text classification ML model(s) separately to perform such dual classification may result in mismatched classifications. For example, a sentence-level classification produced by the trained ML model(s) may indicate that LLM input or output does not include profane content, yet a token-level classification of the same input or output by the same trained ML model(s) may indicate that a particular token in the sentence does include profane content. Inconsistent classifications produced by the model may reduce the model(s)' accuracy and thus the level of confidence when using the model(s) to perform profanity detection. With low accuracy and/or confidence in outputs from such models, downstream functionality may be negatively affected.

Accordingly, conventional approaches for profanity detection are not effective and suffer from the aforementioned technical deficiencies, which hampers their use both individually and as components of a broader processing pipeline.

Embodiments described herein overcome the technical problems of conventional approaches and improve upon the state of the art by introducing techniques for training a profanity detection ML model to perform multiple profanity classification tasks with a simultaneous optimization of the model with respect to the multiple tasks. More specifically, embodiments herein provide techniques for training the ML model to perform (1) sentence-level (e.g., multi-token) profanity classification and (2) token-level (e.g., single token) profanity classification using a loss function comprising a regularization term configured to increase loss based on disagreement between a sentence-level profanity classification and a token-level profanity classification generated by the ML model for a same input sentence (e.g., including two or more tokens). Training the ML model using this co-optimization loss function improves the performance of the ML model for both sentence-level classification and token-level classification individually, while also improving agreement among the tasks (e.g., sentence-level and token-level agreement). As such, not only may the model be capable of performing multiple profanity classification tasks, but may also provide (1) a more accurate sentence-level classification than an ML model trained to perform only sentence-level classification, (2) a more accurate token-level classification than an ML model trained to perform only token-level classification, and (3) more accurate classifications than an ML model trained to performed both profanity classification tasks. Further, training the ML model to perform both profanity classification tasks using a single loss function may be more computationally efficient for training and inference than attempting to optimize two separate ML models for sentence-level and token-level profanity classifications with two loss functions (e.g., a first loss function for sentence-level classification and a second loss function for token-level classification).

The ability of the ML model to produce more accurate profanity classifications further allows for a condition-based architecture during inferencing, which may help to save processing time in some cases. In particular, token-level classification performed by the ML model may be performed only when a sentence-level classification generated for an input sentence (e.g., including two or more tokens) identifies the input sentence as including profane content (e.g., a condition is met when the input sentence is classified as a profanity-containing instance). For example, the ML model may be trained to first generate a sentence-level classification for an input sentence. The ML model may further perform token-level classification for the input sentence if the sentence-level classification classifies the input sentence as a profanity-containing instance, otherwise, the token-level classification and mitigation steps may be skipped at inference time (e.g., early exit). By removing the need to scan tokens of an input sentence that is classified as a non-profanity-containing instance, token-by-token, processing time may be significantly reduced.

As described above, performing a sentence-level classification for an input sentence has drawbacks, such as not being able to specifically mitigate identified profanity-containing instances. As such, by training a model to perform both sentence-level classification and token-level classification with high performance on individual tasks and improved agreement between the task outputs, the ML model may be configured to perform token-level classification for only those input sentences that are indicated to include profanity at the sentence level. Accordingly, a more granular profanity analysis may be performed for only those input sentences identified as profane. For example, assuming the model performs sentence-level classification for ten input sentences, each having a same number of tokens, and only one of those input sentences is classified as a profanity-containing instance, the token-level classification may only need to be performed for the single input sentence classified as the profanity-containing instance. In cases where the token-level classification is assumed to cost about the same for each token-level classification performed, then in this scenario, there may be about a 90% reduction in inference cost, at least with respect to time and resources (e.g., only preforming token-level classification for one of the ten input sentences instead of performing token-level classification for all ten input sentences). Accordingly, enabling the skipping of token-level classification for one or more input sentences classified as non-profanity-containing instance(s) allows input sentences, of varying token lengths, to have comparable inference time. This allows for more scalability while also meeting performance requirements, such as desired service level agreement(s) (SLA(s)) (e.g., satisfying a response time SLA) and/or throughput requirements.

Further, the ability of the ML model to perform more granular profanity classification when a condition is met (e.g., when an input sentence is classified as a profanity-containing instance) allows for specific profane token(s) to be identified in an input sentence classified as profane, such that corrective action can be taken to mask these token(s) and/or replace these token(s) with non-profane tokens having similar meaning (e.g., in the input sentence). The ability to identify particular profane token(s) and take corrective action helps to avoid the dissemination of profane content, and thus provides a technical advantage over those conventional approaches. This is especially important in cases where downstream applications rely on LLMs for such content generation.

In certain aspects, the profanity detection ML model includes one or more encoder layers and one or more classification layers. The one or more encoder layers of the ML model are used to process an input sentence (e.g., including two or more tokens) and produce a continuous representation, also referred to as an "embedding," for each token in the input sentence. The embedding may be a tunable, context aware embedding that assigns each token a representation based on its context (e.g., the parts/tokens that precede or follow the specific token in the input sentence), thereby capturing the use of each token in the input sentence in context. The one or more classification layers of the ML model then take the embedding for each token of the input sentence (e.g., individually or together) as input and output sentence-level and/or and token-level classification (s). In certain aspects, approaches for training the embedding may include using (1) an unsupervised contrastive objective or (2) a supervised contrastive objective.

Using a context aware embedding to perform sentence-level and/or token-level profanity classification provides significant technical advantages over conventional solutions, such as improved profanity detection accuracy (especially for polysemic tokens). For example, the ML model described herein need not use pre-defined list(s) of profane tokens to perform real-time, profanity detection like conventional approaches, and instead performs profanity detection based on a context aware embedding. Providing context as input to the ML model for profanity classification helps the ML model better distinguish profanity-containing instances and/or tokens from non-profanity-containing instances and/or tokens. As a result, false positives identified by the profanity detection ML model may be reduced, which provides a technical advantage over those aforementioned conventional approaches.

Example System for Training and Using an ML Model for Profanity Detection and Mitigation FIG. 1 depicts an example system 100 for training and using an ML model for profanity detection and mitigation. Profanity detection may include detecting impolite, rude, insensitive, obscene, inappropriate, and/or otherwise offensive content at a sentence-level and, in some cases, further at a token-level. In certain embodiments, profanity mitigation includes removing or covering profane token(s) in a plurality of input tokens classified as profane. In certain embodiments, profanity mitigation includes replacing profane token(s) among a plurality of input tokens classified as profane with one or more non-profane tokens having similar meaning as the profane token(s). The ML model may be an encoder only transformer architecture, such as, for example, a decoding-enhanced bidirectional encoder representations from transformers with disentangled attention (DeBERTa) model.

As shown in FIG. 1, training an ML model for profanity detection and mitigation, at 106, includes dataset generation and labeling 110 and training 112. Further, using the ML model for profanity detection and mitigation, at 114, includes sentence-level profanity classification 116, token-level profanity classification 118, and/or concealing 120. In certain embodiments, input fed to the ML model (e.g., user-provided input and/or machine-generated input), and for which profanity detection and/or mitigation is performed, may be used for one or more downstream tasks by one or more downstream applications (e.g., as shown in FIG. 1).

For example, the ML model may be used to detect and mitigate profane content by, for example, concealing one or more tokens in an input sentence (e.g., provided by a user and/or generated by an LLM) including profanity (e.g., thereby creating a "concealed sentence"). In some cases, the concealed sentence is then used to prompt an LLM, instead of prompting the LLM with the user-provided input sentence with one or more tokens including profane content. Use of concealed sentences when prompting the LLM (1) helps to ensure that various users of application(s) that rely on the LLM have the same generative AI-based experience when interacting with/using the application(s) and (2) helps to avoid the generation of profane content by the LLM. In some cases, where the concealed sentence is generated as an alternative to an LLM output sentence including profane content, the concealed sentence may be returned to the downstream application(s), instead of the original profanity-containing sentence generated by the LLM. This helps to avoid the dissemination of profanity-containing text to users (e.g., such as users of application(s) that rely on the LLM) and/or application(s) 622 that rely on the LLM for content generation.

Dataset generation and labeling 110 includes (1) generating training data instance(s) and (2) generating labels for existing training data instances and generated training data instance(s). For example, training data instances 104, stored in datastore 102, may be obtained for training the ML model. Each training data instance 104 may include two or more tokens. For example, in some cases, each training data instance 104 is a sentence including two or more tokens. A first subset of the training data instances 104 may include at least one profanity-containing token, while a second subset of the training data instances 104 may not include any profanity-containing tokens.

In certain embodiments, training data instances 104 include training data instances in two or more languages (e.g., English, Spanish, etc.). In certain embodiments, training data instances 104 include training data instances only in one language (e.g., English only, Spanish only, etc.). In such embodiments, one or more additional training data instances 104 may be generated in one or more other languages. For example, dataset generation at dataset generation and/or labeling 110 may include generating one or more new training data instances for each training data instance 104, where each training data instance created is in a different language. For example, training data instance 104, obtained from datastore 102, may include three English tokens (e.g., "Today is Monday.") Machine translation may be used to create a first new training data instance from training data instance 104 in Spanish (e.g., "Hoy es lunes."), create a second new training data instance from training data instance 104 in French (e.g., "Nous sommes lundi aujourd'hui."), etc. As such, the final dataset, after dataset generation, may include training data instances in one, two, three, or more languages.

Dataset labeling at dataset generation and labeling 110 may include adding meaningful and informative labels to each training data instance 104 (e.g., including existing and generated instances) to provide context such that an ML model can learn from it. For example, dataset labeling may include labeling each training data instance 104 with a first label, where the first label is one of a profanity-containing instance label or a non-profanity-containing instance label. A training data instance 104 may be labeled with a profanity-containing instance label if the instance includes at least one profane word (e.g., referred to herein as "sentence-level profanity classification"). Otherwise, the training data instance 104 may be labeled with a non-profanity-containing instance label. Further, dataset labeling may include labeling each token of each training data instance 104 with a profanity-containing token label or a non-profanity-containing token label (e.g., referred to herein as "token-level profanity classification").

In particular, a token including profane content (e.g., based on a list of known profanity tokens in the same language as the token) may be given a profanity-containing token label, while a token that does not include profane content (e.g., based on a list of known profanity tokens in the same language as the token) may be given a non-profanity-containing token label. By way of example, a training data instance "Today is Monday," may be labeled with a non-profanity-containing instance label, while token "Today," token "is," and token "Monday," are each labeled with a non-profanity-containing token label.

In certain embodiments, one or more techniques are used to help ensure that token-level labels do not contradict with sentence-level labels. For example, tokens of a training data instance including a non-profanity-containing instance label may be expected to each have a non-profanity-containing token label. Further, at least one token of a training data instance including a profanity-containing instance label may be expected to have a profanity-containing token label. Techniques may be used to confirm that such is true for all training data instances 104, and their corresponding tokens.

Figure 2A:
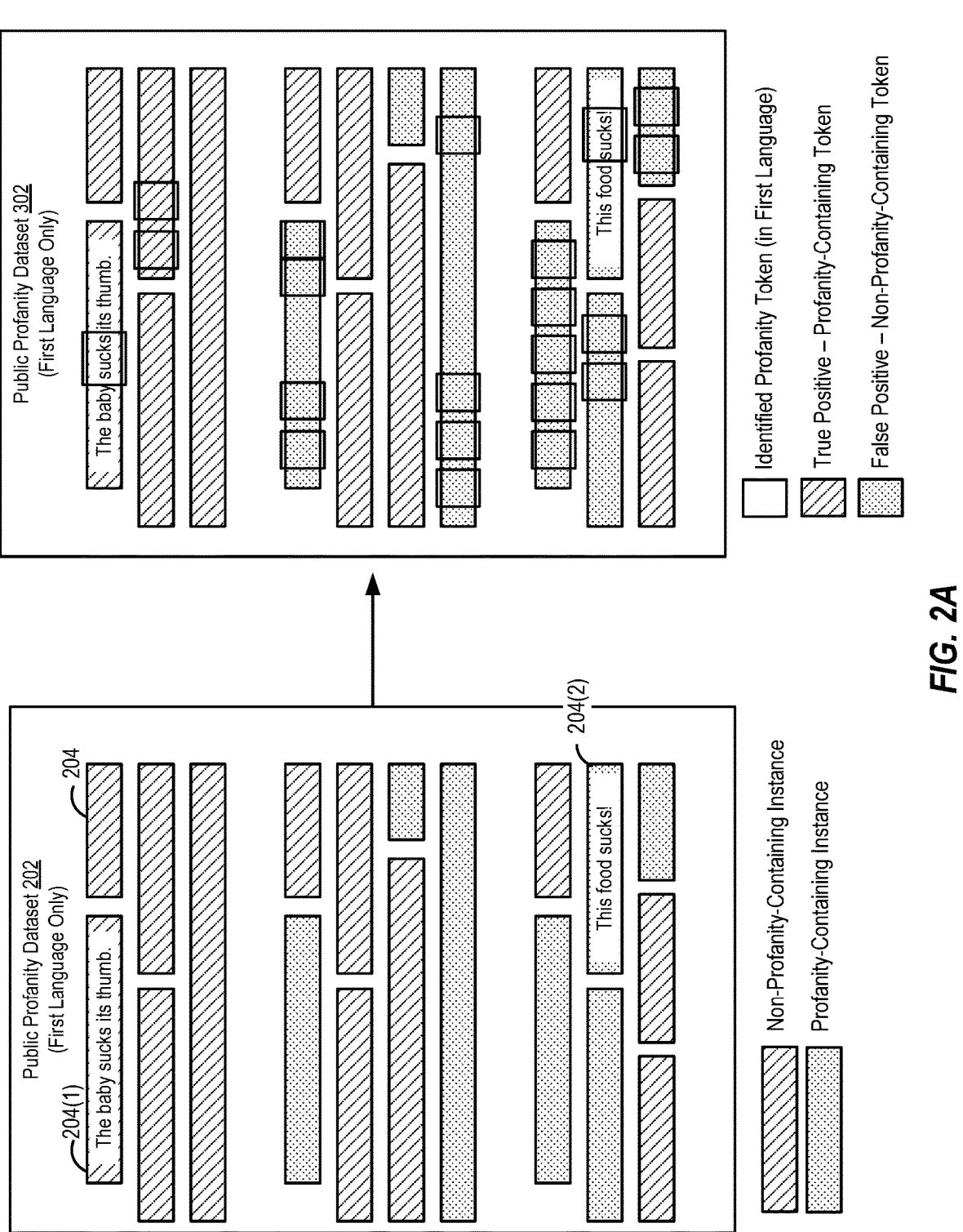
FIG. 2A depicts example dataset labeling for a training dataset in a first language.
Figure 2B:
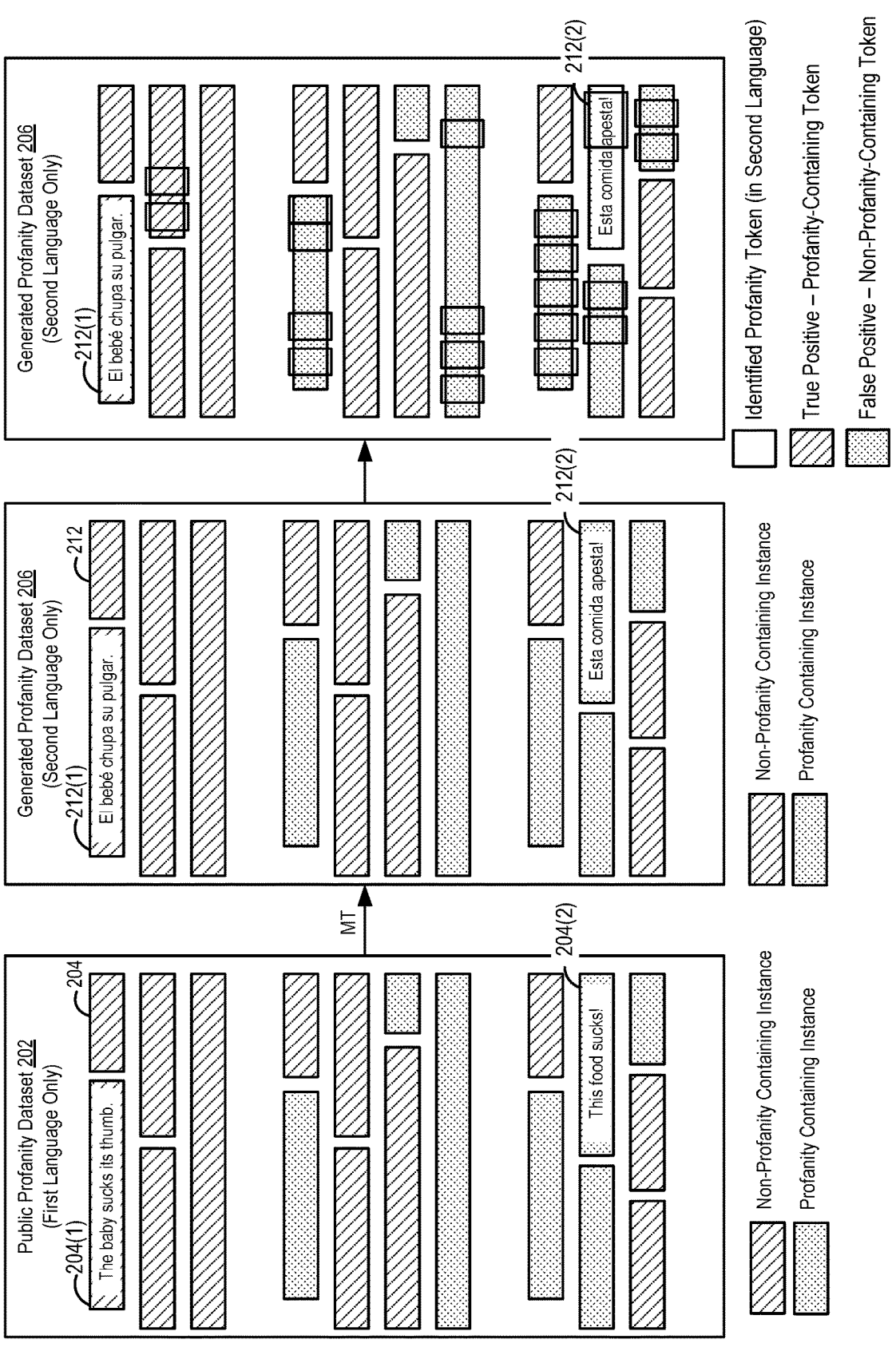
FIG. 2B depicts example machine translation and dataset labeling to create a labeled training dataset in a second language from a training dataset in a first language.
Figure 3:
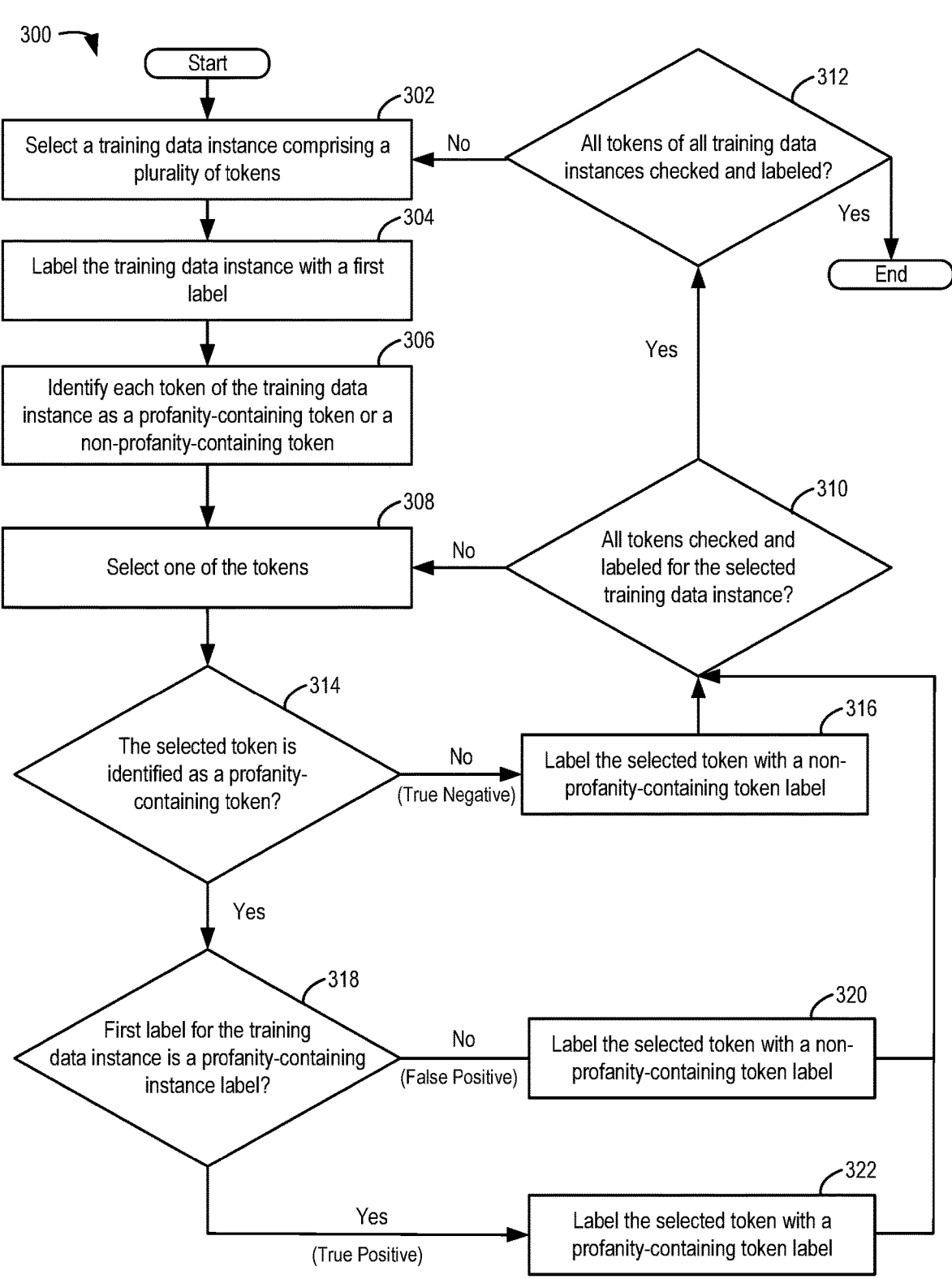
FIG. 3 depicts an example workflow for token label verification.

Additional details regarding dataset generation and/or labeling 110, including performing token-level checks, are provided herein with respect to FIGS. 2A, 2B, and 3.

Training 112 includes training an ML model for sentence-level profanity classification and token-level profanity classification. For example, the ML model may be trained to perform multiple profanity classification tasks to identify a plurality of tokens of an input sentence (e.g., a training data instance), provided as input to the ML model, as a profanity-containing or non-profanity-containing instance (e.g., a profanity-containing or non-profanity-containing sentence), and each token, provided as input, as a profanity-containing or non-profanity-containing token. To train the model, each sentence-level and token-level classification predicted by the model may be compared to sentence-level and token-level labels associated with the input tokens (e.g., for each training data instance). Various parameters may be modified for the ML model based on the comparison for each training data instance.

In certain embodiments, modifying parameter(s) of the ML model is performed until all training data instances 104 have been used to train the ML model. In certain embodiments, modifying parameter(s) of the ML model is performed until a training termination condition is reached for the model. One example of a training termination condition includes convergence (e.g., further training may not lead to any significant loss reduction). Another example of training termination condition includes a number of training steps/epochs reaching pre-determined limit(s) and/or divergence (e.g., further training may cause over-fitting as diagnosable by increasing evaluation loss). Another example of a training termination condition includes a number of contiguous training epochs during which training loss is not decreasing more than a threshold amount (e.g., patience). Other examples of training termination conditions include early stopping criteria, reaching a maximum number of gradient updates, etc.

In certain embodiments, evaluating the similarity of the ML model's predicted output for the input tokens, to the labels associated with the input tokens is performed using a loss function. The loss function may include a regularization term configured to increase loss based on disagreement between a sentence-level profanity classification and a token-level profanity classification, generated by the ML model for a same input plurality of tokens.

Figure 4:
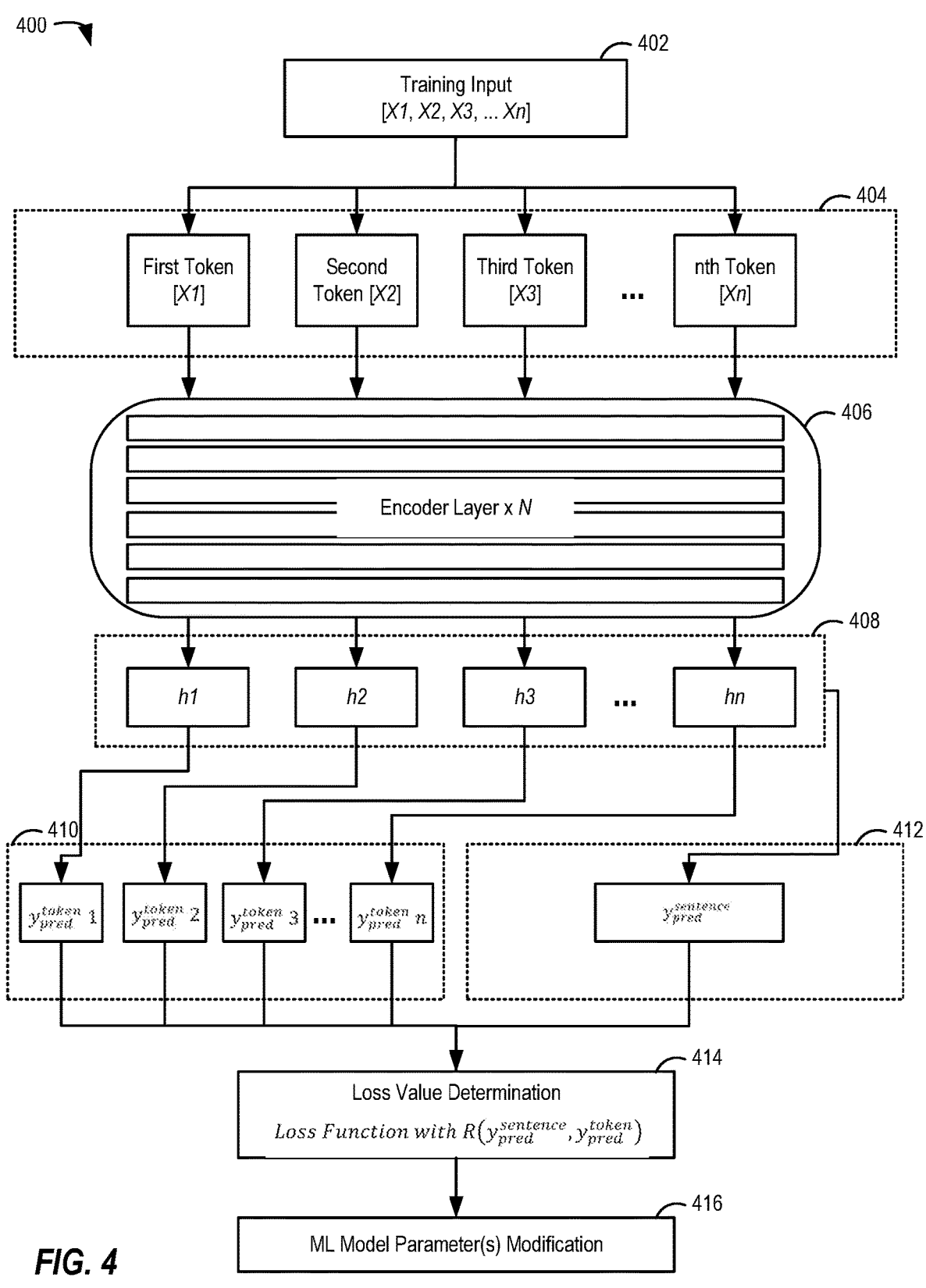
FIG. 4 depicts example training of a machine learning model for profanity detection and mitigation.

Additional details regarding training 112, including training using the loss function comprising the regularization term, are provided herein with respect to FIG. 4.

Sentence-level profanity classification 116 includes, using the trained ML model (e.g., trained at 106) to process an input sentence and classify the input sentence as containing profane content or not. Similarly, token-level profanity classification 118 includes, using the trained ML model (e.g., trained at 106) to process the input tokens and classify each of the input tokens as containing profane content or not. Sentence-level profanity classification 116 may be performed first for the input sentence. Token-level profanity classification 118 may be performed second for the input sentence only if the input sentence is classified as a profanity-containing instance when performing sentence-level profanity classification 116. For example, when sentence-level profanity classification 116 classifies an input sentence as a non-profanity-containing instance, then at 117, it may be determined that the input sentence is not a profanity-containing instance. As such, token-level profanity classification 118 may be skipped. The input sentence classified as a non-profanity-containing instance may be fed to downstream task(s) and/or downstream application(s) (e.g., without changing any of the token(s) included in the input sentence). Alternatively, when sentence-level profanity classification 116 classifies an input sentence as a profanity-containing instance, then at 117, it may be determined that the input sentence is a profanity-containing instance. As such, token-level profanity classification 118 may be performed, and optionally in some cases, concealing 120 (as described below).

For example, the input sentence may include tokens reciting "Today is Monday." The trained ML model may first perform sentence-level profanity classification and generate a non-profanity-containing sentence classification for the input sentence. Because the input sentence is not a profanity-containing instance (e.g., determined at 117), then token-level profanity classification 118 and/or concealing 120 are skipped. Instead, the input sentence may be fed to downstream task(s) and/or downstream application(s), as is.

As another example, the input sentence may include tokens reciting "Dangit, today is Monday!" The trained ML model may first perform sentence-level profanity classification and generate a profanity-containing sentence classification for the input sentence. Because the input sentence is a profanity-containing instance (e.g., determined at 117), then token-level profanity classification 118 is performed. In particular, the trained ML model may next perform token-level profanity classification 118 to classify token "Dangit" as profane and each of the three other tokens (e.g., "today," "is," and "Monday") as not profane (e.g., generate one profanity-containing token and three non-profanity-containing token classifications for the input plurality of tokens). In some cases, the trained ML model may provide the four token-level classifications for "Dangit, today is Monday!" as a single output (e.g., as a single sequence of token classifications generated by the trained ML model).

The input sentence classified as a profanity-containing instance (and having at least one profanity-containing token identified during token-level profanity classification 118) may need to have one or more of its tokens concealed prior to feeding the input sentence to downstream task(s) and/or downstream application(s). For example, in certain embodiments, concealing 120 is performed to hide one or more tokens of the input sentence classified as a profanity-containing instance (and including one or more profanity-containing tokens). Concealing 120 involves (1) removing one or more tokens including profane content, (2) covering one or more tokens including profane content, or (3) substituting one or more tokens including profane content with non-profane token(s). For the above example, concealing 120 may be used to remove the token "Dangit" from the input sentence such that the input sentence reads "[Blank] today is Monday" or substitute the word "Dangit" with "Oh" (e.g., a non-profanity-containing token) such that the input sentence reads "Oh, today is Monday!"

By training the ML model to perform sentence-level classification and token-level classification (e.g., based on a condition being met), the ML model may be able to identify the specific token(s) containing profane content when an input sentence is classified as a non-profanity-containing instance such that concealment can be performed for these token(s), prior to providing these token(s) to downstream task(s) and/or downstream application(s). As such, the dissemination of profane content may be avoided.

Example Aspects Related to Dataset Generation and Labeling

As described with respect to FIG. 1, training an ML model for profanity detection includes dataset generation and labeling (e.g., dataset generation and labeling 110 in FIG. 1). Dataset labeling may include assigning a single label to a plurality of tokens (e.g., a sentence-level label), as well as a single label to each individual token. The label assigned to the tokens may be (1) a profanity-containing instance label indicating that at least one of the tokens contains profane content or (2) a non-profanity-containing instance label indicating that none of the tokens contain profane content. The label assigned to each individual token may be (1) a profanity-containing token label indicating that the specific token contains profane content or (2) a non-profanity-containing token label indicating that the specific token does not contain profane token. Determining whether a token includes profane content or not may be determined by comparing the token to a list of known profanity tokens (e.g., in the same language as the token). For example, a list of known profanity tokens may include the token "sucks." Thus, a token that recites "sucks" may be determined to include profane content.

Example dataset labeling is illustrated in FIGS. 2A and 2B. Specifically, FIG. 2A depicts example dataset labeling for a training dataset in a first language (e.g., English). FIG. 2B depicts example machine translation and dataset labeling to create a labeled training dataset in a second language (e.g., Spanish) from a training dataset in a first language (e.g., English).

As shown in FIG. 2A, a public profanity dataset 202, including training data instances 204 (e.g., examples of training data instances 104 illustrated in FIG. 1), may be obtained to train a ML model for profanity detection and mitigation. Public profanity dataset 202 may be a publicly available dataset (e.g., on the Internet) or a previously-generated dataset.

Each training data instance 204 in public profanity dataset 202 may include two or more tokens. Specifically, in this example, each training data instance 204 is a sentence containing two or more tokens. Each training data instance 204 in public profanity dataset 202 may be labeled as a profanity-containing instance or a non-profanity-containing instance. For example, a first subset (e.g., one or more) of the training data instances 204 in public profanity dataset 202 may be non-profanity-containing instances indicating that these training data instance(s) 204 do not include profane content. Further, a second subset (e.g., one or more) of the training data instances 204 in public profanity dataset 202 may be profanity-containing instances indicating that these training data instance(s) 204 include profane content. Non-profanity-containing instance and profanity-containing instance labels may have been previously added to training data instances 204 in public profanity dataset 202 (e.g., in some cases by a user).

As shown, an example first training data instance 204(1) in public profanity dataset 202 recites, "The baby sucks its thumb." First training data instance 204(1) includes five tokens and may be labeled as a non-profanity-containing instance. Further, an example second training data instance 204(2) in public profanity dataset 202 recites, "This food sucks!" Second training data instance 204(2) includes three tokens and may be labeled as a profanity-containing instance. Although both first training data instance 204(1) and second training data instance 204(2) include token "sucks," only the use of "sucks" in second training data instance 204(2) involves profanity use, while the use of "sucks" in first training data instance 204(1) has a different connotation (e.g., based on the context of first training data instance 204(1)).

To add token-level labels to training data instances 204, tokens in training data instances 204 may be compared to tokens in a list of known profane, English tokens. Example known profane, English tokens included in the list may include tokens such as "sucks," "crap," "dangit," "damn," etc. If the token being compared matches one of the tokens included in the list of known profane, English tokens, then the token may be labeled with a profanity-containing token label. Alternatively, if the token being compared does not match any of the tokens included in the list, then the token may be labeled with a non-profanity-containing token label.

Tokens included in training data instances 204 labeled as non-profanity-containing instances may be expected to be assigned only non-profanity-containing token labels; however, as shown in FIG. 2A, this may not always be the case. In particular, token labeling using a list of known profane, English tokens may not take into consideration the context of the token being analyzed. As such, this may result in one or more tokens (e.g., specifically those tokens included in the list and having two or more meanings) in one or more non-profanity-containing instances being assigned profanity-containing token labels.

For example, the token "sucks" may have at least three denotations. In a first denotation, "sucks" means to "draw into the mouth." In a second denotation, "sucks" means to "draw in a specified direction by creating a vacuum." In a third denotation, "sucks" means "very bad, disagreeable, or disgusting." If at least one denotation of a token indicates that a token is profane, then the token is added to the list of known profane, English tokens. Thus, here, due to at least the third denotation of "sucks," this token is added to the list.

Accordingly, any token reciting "sucks," in any training data instance 204 regardless of its sentence-level label, may be assigned a profanity-containing token label. For example, because both first training data instance 204(1) and second training data instance 204(2) include token "sucks," this token is assigned a profanity-containing token label. While the token "sucks" used in second training data instance 204(2) may be used in a profane manner (e.g., based on its surrounding context in second training data instance 204 (2)), the token "sucks," used in first training data instance 204(1) may be a false positive indication of a profanity-containing token. As used herein, a false positive indication of a profanity-containing token may be a token assigned a profanity-containing token label that belongs to a sentence (e.g., a plurality of tokens) assigned a non-profanity-containing instance label.

In certain embodiments, one or more techniques are introduced to modify the profanity-containing token label assigned to a token associated with a plurality of tokens assigned a non-profanity-containing instance label. These techniques are used to help reduce the amount of false positive profanity-containing token labels assigned to tokens of the training data instances 204. For example, FIG. 3 depicts an example workflow 300 for token label verification.

Workflow 300 begins after training data instances (e.g., training data instances 204 in FIG. 2A) have been gathered and/or generated, but before training data instances are labeled with sentence-level and token-level profanity labels. Thus, workflow 300 begins, at 302 with selecting a training data instance from the plurality of gathered/generated training data instances. The selected training data instance may include a plurality of tokens.

At step 304, the training data instance is labeled with a first label. The first label may be a profanity-containing label or a non-profanity-containing label. The first label may be generated by a user for the selected training data instance, may be based on a previous classification of the training data instance, etc.

At step 306, each token of the selected training data instance is identified as a profanity-containing token or a non-profanity-containing token. For example, each token may be identified as a profanity-containing token or a non-profanity-containing token based on list(s) of known profane words (e.g., in one or more languages).

At step 308, one of the tokens of the selected training data instance (e.g., selected at step 302) are selected. At step 314, it is determined whether the selected token is identified as a profanity-containing token (e.g., at step 306). If the selected token is not identified as a profanity-containing token (e.g., instead identified as a non-profanity-containing token), then at step 316, the selected token is labeled with a non-profanity-containing token label. In other words, because the sentence-level label and the token-level identification match and indicate that no profane content is present, the token may be labeled with a non-profanity-containing token label. This is an example of a "true negative" token.

Alternatively, if the selected token is identified as a profanity-containing token, then at step 318, it is determined whether the first label assigned to the training data instance is a profanity-containing instance label. If the training data instance is a profanity-containing instance label, then at step 322, the selected token is labeled with a profanity-containing token label. In other words, because the sentence-level label and the token-level identification match and indicate that profane content is present, the token may be labeled with a profanity-containing token label. This is an example of a "true positive" token.

Alternatively, if the training data instance is a profanity-containing instance label, then at step 320, the selected token is labeled with a non-profanity-containing token label. In particular, in this case, the token is identified as containing profane content, but the plurality of tokens that the selected token belongs to are identified as not containing any profane content. Priority may be given to the sentence-level profanity classification label, and thus, the token may be labeled with a label indicating that the token does not, in fact, contain profane content.

For example, as shown in FIG. 2A, first training data instance 204(1) recites "The baby sucks its thumb" and is assigned a non-profanity-containing instance label. When labeling each token in first training data instance 204(1), token "sucks" may be identified as a profanity-containing instance label (e.g., based on the list of known profane, English tokens). However, "sucks" in this context may not constitute a profane usage, although the token is found in the list of known profane, English tokens. As such, priority may be given to the non-profanity-containing instance label assigned to first training data instance 204(1), and instead of assigning token "sucks" a profanity-containing token label, token "sucks" may be assigned a non-profanity-containing token label.

After labeling the selected token at step 316, step 320, or step 322 in FIG. 3, workflow 300 proceeds to step 310, where it is determined whether all tokens of the selected training data instance (e.g., selected at step 302) have been checked and labeled. If all tokens have not been checked and labeled, then workflow 300 returns to step 308 to select another token of the selected training data instance. Alternatively, if all tokens of the selected training data instance have been checked and labeled, then workflow 300 proceeds to step 312. At step 312, it is determined whether all tokens of all training data instances have been checked and labeled (e.g., according to steps 304-322). If all tokens of all training data instances have not been checked and labeled, then workflow 300 returns to step 302 to select another training data instance. Alternatively, if all tokens of all training data instances have been checked and labeled, then workflow 300 is complete. In other words, training data instance checks and labeling may be complete, and the training data instances may be used for training an ML model.

In certain embodiments, an ML model may be trained to perform multilingual profanity detection and mitigation. As such, training data instances used to train the ML model may need to include profanity-containing and non-profanity-containing instances in multiple languages. FIG. 2B depicts example machine translation and dataset labeling used to create training data instances in a second language using training data instances in a first language, such that the training data instances are associated with at least two different languages.

As shown in FIG. 2B, similar to FIG. 2A, a public profanity dataset 202, including training data instances 204 (e.g., examples of training data instances 104 illustrated in FIG. 1), may be obtained to train a ML model for profanity detection and mitigation. Each of the training data instances 204 in public profanity dataset 202 may be in a first language, for example, in English.

Machine translation may be used to create training data instances in at least a second language using the training data instances 204 in public profanity dataset 202. Specifically, in the example depicted in FIG. 2B, machine translation may be applied to each training data instance 204 to create a corresponding training data instance 212 in generated profanity dataset 206. Training data instances 204 in public profanity dataset 202 are English training data instances, while training data instances 212 generated in generated profanity dataset 206 are Spanish training data instances. Though this example depicts only the creation of Spanish training data instances 212 using machine translation, in some other examples, training data instances in one or more other languages may be generated.

For example, as shown in FIG. 2B, machine translation may be used to generate first training data instance 212(1) from first training data instance 204(1). Specifically, "El bebé chupa su pulgar." is the Spanish translation of "The baby sucks its thumb." Additionally, as another example, machine translation may be used to generate second training data instance 212(2) from second training data instance 204(2). Specifically, "Esta comida apesta!" is the Spanish translation of "This food sucks!"

Each training data instance 212 in generated profanity dataset 206 may be assigned a same sentence-level profanity label as the training data instance 204 used to generate the respective training data instance 212. For example, first training data instance 204(1) is assigned a non-profanity-containing instance label. Because first training data instance 212(1) is generated from first training data instance 204(1), first training data instance 212(1) may also be assigned a non-profanity-containing instance label. Additionally, second training data instance 204(2) is assigned a profanity-containing instance label. Because second training data instance 212(2) is generated from second training data instance 204(2), second training data instance 212(2) may also be assigned a profanity-containing instance label.

After generating and labeling each training data instance 212 in generated profanity dataset 206, token-level labels may be added. For example, similar to FIG. 2A, to add token-level labels to training data instances 212 in generated profanity dataset 206, token(s) in training data instances 212 may be compared to tokens is a list of known profane, tokens. However, unlike FIG. 2A, the list of known profane tokens may be a list of known profane, Spanish tokens instead of a list of known profane, English tokens. In other words, one list of known profane tokens may be maintained for each language for purposes of token labeling.

Using the list of known profane, Spanish tokens, each token in training data instances 212 may be labeled with a profanity-containing token label and/or a non-profanity-containing token label. In certain embodiments, similar to FIG. 2A, one or more techniques are introduced to modify the profanity-containing token label assigned to each token associated with a sentence (e.g., a plurality of tokens) assigned a non-profanity-containing instance label. Specifically, when labeling token(s) of training data instances 212 in generated profanity dataset 206, workflow 300 may be used to help reduce the amount of false positive profanity-containing token labels assigned to tokens of the training data instances 212.

Labeled training data instances 212 in generated profanity dataset 206 may be combined with training data instances 204 in public profanity dataset 202 to create a single training dataset, including training data instances in multiple languages. These training data instances may be used to train an ML model for multilingual profanity detection and mitigation.

Example Aspects Related to Training an ML Model for Profanity Detection and Mitigation As described with respect to FIG. 1, training an ML model to perform profanity detection and mitigation may include training the ML model to perform sentence-level profanity classification and token-level profanity classification. For example, the ML model may be trained to perform multiple profanity classification tasks to identify a plurality of tokens (e.g., a training data instance), provided as input to the ML model, as one of a profanity-containing or a non-profanity-containing instance (e.g., a profanity-containing or a non-profanity-containing sentence), and each token, provided as input and belonging to a plurality of tokens classified as a profanity-containing instance, as one of a profanity-containing or non-profanity-containing token.

FIG. 4 depicts example training of an ML model for profanity detection and mitigation. As depicted in FIG. 4, training input 402 is used as input to train the ML model. Training input 402 includes two or more tokens, e.g., [X1, X2, X3, . . . Xn] (e.g., up to n tokens, where n is an integer greater than one).

Training input 402 may be a training data instance in a first language labeled with multiple labels. For example, training input 402 may have been previously assigned a profanity-containing instance label or a non-profanity-containing instance label. Further, each token in training input 402 may have been previously assigned a profanity-containing token label or a non-profanity-containing label. Labeling of training input 402 may have been performed according to the techniques described above with respect to FIG. 2A, 2B, and/or 3.

Although not meant to be limiting, in this example, training input 402 may recite "Dangit, it is Monday!" and thus include four tokens. As such, training input 402 may be assigned a profanity-containing instance label, as well as one profanity-containing token label for token "Dangit" and three non-profanity-containing token labels for tokens "it," "is," and "Monday."

Training input 402 is tokenized, at 404, into each of its respective tokens and provided to an input layer of an ML model. The ML model includes one or more encoder layers 406 (e.g., N encoder layers 406, where N is an integer greater than zero) and one or more classification layers (e.g., not shown). The one or more encoder layers 406 of the ML model may process the tokens and thereby produce an embedding for each token. For example, a hidden representation vector may be generated for each token (e.g., h1 is produced for first token X1, h2 is produced for second token X2 etc.), which is shown at 408 in FIG. 4. The embedding produced for each token may be a representation of the token based on its context (e.g., the parts/tokens that precede or follow the specific token in the input sentence).

One classification layer of the ML model may be used to perform sentence-level profanity classification, while another classification layer of the ML model may be used to perform token-level profanity classification.

For token-level profanity classification, the ML model may generate a first output for each of the tokens included in training input 402. In particular, the ML model may generate first output $$y_{pred}^{token}$$

1 for token X1, first output $$y_{pred}^{token}$$

2 for token X2, first output $$y_{pred}^{token}$$

3 for token X3, etc. (e.g., shown at 410). The ML model may generate a first output for a particular token based on the hidden representation vector generated for the particular token (e.g., h1 is used to generate $$y_{pred}^{token}$$

1 for token X1). The first output generated for each token may classify the respective token as a profanity-containing token or a non-profanity-containing token.

For sentence-level profanity classification, the ML model may generate a second output for training input 402. More specifically, the ML model may collectively use the hidden representation vector generated for each token of training input 402 (e.g., aggregation 408 of h1, h2, h3 . . . hn) to generate the second output, $$y_{pred}^{sentence}$$

(e.g., shown at 412). The second output may classify training input 402 as a profanity-containing instance or a non-profanity-containing instance.

Loss value determination 414 is then performed to determine whether to modify one or more parameters of the ML model. Loss value determination 414 may include (1) evaluating the similarity of the second output, $$y_{pred}^{sentence},$$

to the sentence-level label assigned to training input 402 and (2) evaluating the similarity of the first output, $$y_{pred}^{token},$$

generated for each token of training input 402, to the token-level label assigned to each respective token. In certain embodiments, evaluating the similarity of the second output, $$y_{pred}^{sentence},$$

to the sentence-level label and evaluating the similarity of each first output, $$y_{pred}^{token},$$

to each token-level label is performed using a loss, function. The loss function may include a regularization term $$\left(R\!\left(y_{pred}^{sent},\, y_{pred}^{token}\right)\right)$$

configured to increase loss based on disagreement between a sentence-level profanity classification and a token-level profanity classification generated for a same training input. For instance, the regularization term $$\left(R\!\left(y_{pred}^{sent},\, y_{pred}^{token}\right)\right)$$

may penalize the disagreement between $$y_{pred}^{sent}$$

and $$y_{pred}^{token}$$

$$\delta\!\left(y_{pred}^{sent} - 1\right) \sum\nolimits_{k} \left(y_{pred,k}^{token} - y_{true,k}^{token}\right)$$

where $$y_{pred}^{sent}$$

is the predicted sentence-level profanity classification for training input 402, k is the total number of tokens included in training input 402, $$y_{pred,k}^{token}$$

is the predicted token-level profanity classification for a token k in training input 402, and $$y_{true,k}^{token}$$

is the true token-level profanity classification for a token k in training input 402 (e.g., the token-level label assigned to token k in training input 402). The loss function may also be configured to increase/decrease loss based on the similarity of the second output, $$y_{pred}^{sentence},$$

to the sentence-level label assigned to training input 402. Further, the loss function may also be configured to increase/decrease loss based on the similarity of the first output, $$y_{pred}^{token},$$

generated for each token of training input 402, to the token-level label assigned to each respective token.

For example, assuming training input 402 recites "It is Monday today," the ML model may generate four first outputs and one second output. In this example, second output generated by the ML model may inaccurately classify training input 402 as a profanity-containing instance, while first output generated by the ML model for each token may accurately classify each token of training input 402 as a non-profanity-containing token. In this case, the second output (e.g., the sentence-level profanity classification) does not match each of the first outputs (e.g., the token-level profanity classifications). For example, the ML model is identifying training input 402 as a profanity-containing instance without identifying any profanity-containing tokens within training input 402. It may not be feasible for a training input 402 to be accurately classified as a profanity-containing instance without the training input 402 including any profanity-containing tokens. As such, the loss value determined for loss value determination 414 may be increased to account for this mismatch between outputs.

In certain aspects, the regularization term may be structured such that (1) a sentence-level profanity classification identifying a training input 402 as including profane content is given a score of "1" and (2) a sentence-level profanity classification identifying a training input 402 as not including profane content is given a score of "0." Further, the regularization term may be structured such that (1) a token-level profanity classification identifying a token of training input 402 as including profane content is given a score of "1" and (2) a token-level profanity classification identifying a training input 402 as not including profane content is given a score of "0." Accordingly, in a case where a training input 402 is classified as a profanity-containing instance, a score of "1" may be assigned to the training input 402. If at least one token of training input is classified as a profanity-containing token and given a score of "1," the regularization term may subtract 1−1 to reach a regularization term equal to 0. A regularization term equal to 0, or less (e.g., negative), may not be penalized when training the ML model.

The loss value determined for loss value determination 414 may also be increased in cases where the second output, e.g., the sentence-level classification, generated for training input 402 does not match the sentence-level label assigned to training input 402 (e.g., indicating an incorrect prediction by the ML model). Alternatively, the loss value determined for loss value determination 414 may be decreased in cases where the second output, e.g., the sentence-level classification, generated for training input 402 does match the sentence-level label assigned to training input 402 (e.g., indicating a correct prediction by the ML model).

Further, the loss value determined for loss value determination 414 may also be increased in cases where the first output associated with a token, e.g., a token-level classification, does not match the token-level label assigned to the specific token (e.g., indicating an incorrect prediction by the ML model). Alternatively, the loss value determined for loss value determination 414 may be decreased in cases where the first output associated with a token, e.g., the token-level classification, does match the token-level label assigned to the specific token (e.g., indicating a correct prediction by the ML model).

Thus, a loss function may be defined as:

$$L_{MTL}=F(L^{SENT},L^{TOK},R(y_{pred}^{SENT},y_{pred}^{TOK}))$$

where MTL stands for "multi-task learning" (e.g., conditional MTL), $L^{SENT}$ represents the sentence classification loss, $L^{TOK}$ represents the token classification loss, and $R(y_{pred}^{SENT}, y_{pred}^{TOK})$ represents the regularization term. The loss function represents the combined loss in a functional form. During model training, the loss function may be used, rather than using only the regularization term, to help avoid "mode collapse." Mode collapse is the phenomenon where an ML model generates limited and/or repetitive outputs, failing to capture the full diversity of the data it's trained on. For example, here mode collapse may occur when the ML model converges to one of the trivial solutions for both sentence classification and token classification, predicting the same thing (e.g., always 1 or always 0).

Determining whether to modify one or more parameters of the ML model, at 416, may be based on the loss value determined for loss value determination 414.

In certain embodiments, multiple training inputs 402 are used to train the ML model. For example, multiple training inputs 402 may be provided as input into the ML model to (1) generate first outputs (e.g., per token for each training input 402) and second outputs (e.g., per training input 402), (2) determine loss values, and, in some cases, (3) modify parameter(s) of the ML model. Training the ML model may be complete when all available training input (e.g., training data instances) have been used to train the ML model and/or when a desired confidence level for the ML model is achieved.

Example Method for Training an ML Model to Detect Profanity

FIG. 5 depicts an example method 500 for training an ML model to detect profanity. Method 500 may be performed by one or more processor(s) of a computing device, such as processor(s) 702 of processing system 700 described below with respect FIG. 7.

Method 500 begins, at step 502, with labeling each of a plurality of training data instances with a first label. The first label may include a profanity-containing instance label or a non-profanity-containing instance label.

In certain embodiments, labeling each of a plurality of training data instances with the first label includes: labeling each of the first set of the first training data instances with the first label and for each respective first training data instance, labeling the second training data instance generated based on the respective first training data instance with the same first label as the respective first training data instance.

Method 500 proceeds, at step 504, with labeling each token of a plurality of tokens for each of the plurality of training data instances with a second label. The second label may include a profanity-containing token label or a non-profanity-containing token label.

In certain embodiments, labeling each token of the plurality of tokens for each of the plurality of training data instances with a second label includes, for one or more tokens of the plurality of tokens, determining that each of the one or more tokens are not included in a list of known profanity tokens. The list of known profanity tokens may include a plurality of profanity tokens in two or more languages. Based on each of the one or more tokens not being included in the list of known profanity tokens, each of the one or more tokens are labeled with the non-profanity-containing token label.

In certain embodiments, labeling each token of the plurality of tokens for each of the plurality of training data instances with a second label includes, for one or more tokens of the plurality of tokens, determining that each of the one or more tokens are included in a list of known profanity words. The list of known profanity tokens comprises a plurality of profanity tokens in two or more languages. Based on each of the one or more tokens being included in the list of known profanity words, for each respective token of the one or more tokens, method 500 includes determining whether the first label associated with the training data instance comprising the respective token is the profanity-containing instance label or the non-profanity-containing instance label. When the first label associated with the training data instance includes the respective token is the profanity-containing instance label, method 500 includes labeling the respective token with the profanity-containing instance label. When the first label associated with the training data instance comprising the respective token is the non-profanity-containing instance label, method 500 includes labeling the token with the non-profanity-containing instance label.

Method 500 proceeds, at step 506, with training the ML model. Training the ML model, at step 506, may include steps 508-516 for each training data instance of the plurality of training data instances.

Specifically, method 500 proceeds, at step 508 with providing the plurality of tokens of the respective training data instance to an input layer of the ML model.

Method 500 proceeds, at step 510, with receiving a first output for each of the plurality of tokens of the respective training data instance classifying the respective token as a profanity-containing token or a non-profanity-containing token. In certain embodiments, receiving the first output for each of the plurality of tokens of the respective training data instance comprises receiving the first output for each of the plurality of tokens as a sequence of tokens.

Method 500 proceeds, at step 512, with receiving a second output for the respective training data instance classifying the respective training data instance as a profanity-containing instance or a non-profanity-containing instance.

Method 500 proceeds, at step 514, with determining a loss value based on the first output for each of the plurality of tokens and the second output using a loss function comprising a regularization term configured to increase loss based on disagreement between the first output for each of the plurality of tokens and the second output.

Method 500 proceeds, at step 516, with modifying one or more parameters of the ML model based on the loss value.

In certain embodiments, method 500 further includes obtaining a first set of first training data instances in a first language, and for each first training data instance in the first set of first training data instances, generating, via machine translation, a second training data instance to create a second set of second training data instances in a second language, wherein the plurality of training data instances comprises the first set of first training data instances and the second set of second training data instances.

In certain embodiments, the ML model is an encoder only transformer architecture. The encoder only transformer architecture comprises a decoding-enhanced bidirectional encoder representations from transformers with disentangled attention (DeBERTa) model Note that FIG. 5 is just one example of a method, and other methods including fewer, additional, or alternative steps are possible consistent with this disclosure.

Example Method for Profanity Detection

FIG. 6 depicts an example method 600 for profanity detection. Method 600 may be performed by one or more processor(s) of a computing device, such as processor(s) 702 of processing system 700 described below with respect FIG. 7.

Method 600 begins, at step 602, with receiving a first input sentence including a first plurality of tokens.

Method 600 proceeds, at step 604, with processing, with a ML model trained for sentence-level profanity classification and token-level profanity classification using a loss function comprising a regularization term configured to increase loss based on disagreement between a sentence-level profanity classification and a token-level profanity classification generated for a same input sentence, the first input sentence including the first plurality of tokens. Processing the input sentence with the ML model may thereby generate a first classification output for the first input sentence, wherein the first classification output comprises a profanity-containing sentence classification.

Method 600 proceeds, at step 606, with determining the first classification output for the first input sentence comprises the profanity-containing sentence classification.

Method 600 proceeds, at step 608, with based on the determination, processing with the ML model the first input sentence comprising the plurality of tokens. Processing the input sentence with the ML model may thereby generate a second classification output for each of the first plurality of tokens of the first input sentence, wherein the second classification output generated for at least one token of the first plurality of tokens comprises a profanity-containing token classification.

In certain embodiments, method 600 further includes concealing the at least one token in the first input sentence; and using the first input sentence comprising the at least one concealed token to perform one or more tasks.

In certain embodiments, method 600 further includes receiving a second input sentence comprising a second plurality of tokens; processing, with the ML model, the second input sentence comprising the second plurality of tokens and thereby generating a third classification output for the second input sentence, the third classification output comprising a non-profanity-containing sentence classification; determining the third classification output for the second input sentence comprises the non-profanity-containing sentence classification; and based on the determination, using the second input sentence to perform one or more tasks.

In certain embodiments, method 600 further includes training the ML model for the sentence-level profanity classification and the token-level profanity classification using a plurality of training data instances. Training the ML model may include, for each training data instance of the plurality of training data instances: providing a plurality of tokens of the respective training data instance to an input layer of the ML model; receiving a first output for each of the plurality of tokens of the respective training data instance classifying the respective token as a profanity-containing token or a non-profanity-containing token; receiving a second output for the respective training data instance classifying the respective training data instance as a profanity-containing instance or a non-profanity-containing instance; determining a loss value based on the first output for each of the plurality of tokens and the second output using the loss function comprising the regularization term; and modifying one or more parameters of the ML model based on the loss value. In certain embodiments, receiving the first output for each of the plurality of tokens of the respective training data instance comprises receiving the first output for each of the plurality of tokens as a sequence of tokens.

In certain embodiments, method 600 further includes, prior to training the ML model: labeling each of the plurality of training data instances with a first label, the first label comprising a profanity-containing instance label or a non-profanity-containing instance label; and labeling each token of a plurality of tokens for each of the plurality of training data instances with a second label, the second label comprising a profanity-containing token label or a non-profanity-containing token label.

In certain embodiments, labeling each token of the plurality of tokens for each of the plurality of training data instances with a second label includes, for one or more tokens of the plurality of tokens: determining that each of the one or more tokens are not included in a list of known profanity tokens. The list of known profanity tokens may include a plurality of profanity tokens in two or more languages. Based on each of the one or more tokens not being included in the list of known profanity tokens, method 600 includes labeling each of the one or more tokens with the non-profanity-containing token label.

In certain embodiments, labeling each token of the plurality of tokens for each of the plurality of training data instances with a second label includes, for one or more tokens of the plurality of tokens determining that each of the one or more tokens are included in a list of known profanity words. The list of known profanity tokens may include a plurality of profanity tokens in two or more languages. Based on each of the one or more tokens being included in the list of known profanity words, method 600 includes, for each respective token of the one or more tokens: determining whether the first label associated with the training data instance comprising the respective token is the profanity-containing instance label or the non-profanity-containing instance label. When the first label associated with the training data instance including the respective token is the profanity-containing instance label, method 600 includes labeling the respective token with the profanity-containing instance label. When the first label associated with the training data instance including the respective token is the non-profanity-containing instance label, method 600 includes labeling the token with the non-profanity-containing instance label.

In certain embodiments, method 600 further includes, prior to training the ML model: obtaining a first set of first training data instances in a first language. For each first training data instance in the first set of first training data instances, method 600 may include generating, via machine translation, a second training data instance to create a second set of second training data instances in a second language. The plurality of training data instances may include the first set of first training data instances and the second set of second training data instances.

In certain embodiments, labeling each of a plurality of training data instances with the first label includes labeling each of the first set of the first training data instances with the first label; and for each respective first training data instance, labeling the second training data instance generated based on the respective first training data instance with the same first label as the respective first training data instance.

In certain embodiments, the ML model is an encoder only transformer architecture. The encoder only transformer architecture comprises a decoding-enhanced bidirectional encoder representations from transformers with disentangled attention (DeBERTa) model.

Note that FIG. 6 is just one example of a method, and other methods including fewer, additional, or alternative steps are possible consistent with this disclosure.

Example Processing System for Profanity Detection

Figure 7:
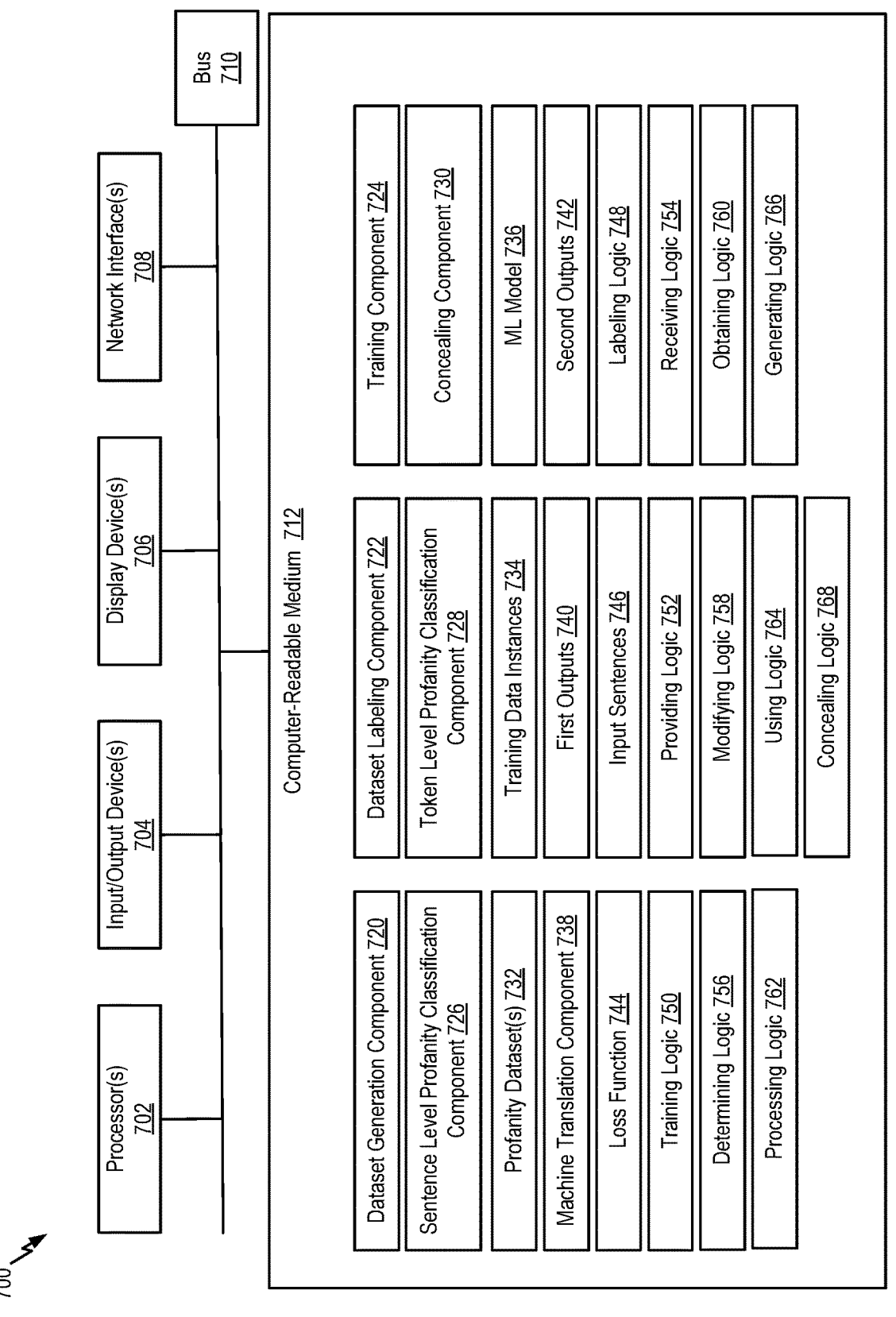
FIG. 7 depicts an example processing system with which aspects of the present disclosure can be performed.

FIG. 7 depicts an example processing system 700 configured to perform various aspects described herein, including, for example, method 400 as described above with respect to FIG. 4, method 500 as described above with respect to FIG. 5, and/or method 600 as described above with respect to FIG. 6.

Processing system 700 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 700 includes one or more processors 702, one or more input/output devices 704, one or more display devices 706, one or more network interfaces 708 through which processing system 700 is connected to one or more networks (e.g., a local network, an intranet, the Internet, or any other group of processing systems communicatively connected to each other), and computer-readable medium 712. In the depicted example, the aforementioned components are coupled by a bus 710, which may generally be configured for data exchange amongst the components. Bus 710 may be representative of multiple buses, while only one is depicted for simplicity.

Processor(s) 702 are generally configured to retrieve and execute instructions stored in one or more memories, including local memories like computer-readable medium 712, as well as remote memories and data stores. Similarly, processor(s) 702 are configured to store application data residing in local memories like the computer-readable medium 712, as well as remote memories and data stores. More generally, bus 710 is configured to transmit programming instructions and application data among the processor(s) 702, display device(s) 706, network interface(s) 708, and/or computer-readable medium 712. In certain embodiments, processor(s) 702 are representative of one or more central processing units (CPUs), graphics processing units (GPUs), tensor processing units (TPUs), accelerators, and other processing devices.

Input/output device(s) 704 may include any device, mechanism, system, interactive display, and/or various other hardware and software components for communicating information between processing system 700 and a user of processing system 700. For example, input/output device(s) 704 may include input hardware, such as a keyboard, touch screen, button, microphone, speaker, and/or other device for receiving inputs from the user and sending outputs to the user.

Display device(s) 706 may generally include any sort of device configured to display data, information, graphics, user interface elements, and the like to a user. For example, display device(s) 706 may include internal and external displays such as an internal display of a tablet computer or an external display for a server computer or a projector. Display device(s) 706 may further include displays for devices, such as augmented, virtual, and/or extended reality devices. In various embodiments, display device(s) 716 may be configured to display a graphical user interface.

Network interface(s) 708 provide processing system 700 with access to external networks and thereby to external processing systems. Network interface(s) 708 can generally be any hardware and/or software capable of transmitting and/or receiving data via a wired or wireless network connection. Accordingly, network interface(s) 708 can include a communication transceiver for sending and/or receiving any wired and/or wireless communication.

Computer-readable medium 712 may be a volatile memory, such as a random access memory (RAM), or a nonvolatile memory, such as nonvolatile random access memory (NVRAM), or the like. In this example, computer-readable medium 712 includes dataset generation component 720, dataset labeling component 722, training component 724, sentence-level profanity classification component 726, token-level profanity classification component 728, concealing component 730, profanity dataset(s) 732, training data instances 734, a ML model 736, machine translation component 738, first outputs 740, second outputs 742, a loss function 744, input sentences 746, labeling logic 748, training logic 750, providing logic 752, receiving logic 754, determining logic 756, modifying logic 758, obtaining logic 760, processing logic 762, using logic 764, generating logic 766, and concealing logic 768.

In certain embodiments, labeling logic 748 includes logic for labeling each of a plurality of training data instances with a first label, the first label comprising a profanity-containing instance label or a non-profanity-containing instance label. In certain embodiments, labeling logic 748 includes logic for labeling each token of a plurality of tokens for each of the plurality of training data instances with a second label, the second label comprising a profanity-containing token label or a non-profanity-containing token label. In certain embodiments, labeling logic 748 includes logic for, based on each of the one or more tokens not being included in the list of known profanity tokens, labeling each of the one or more tokens with the non-profanity-containing token label. In certain embodiments, labeling logic 748 includes logic for, when the first label associated with the training data instance comprising the respective token is the profanity-containing instance label, labeling the respective token with the pro-fanity-containing instance label. In certain embodiments, labeling logic 748 includes logic for, when the first label associated with the training data instance comprising the respective token is the non-profanity-containing instance label, labeling the token with the non-profanity-containing instance label. In certain embodiments, labeling logic 748 includes logic for labeling each of the first set of the first training data instances with the first label. In certain embodiments, labeling logic 748 includes logic for, for each respective first training data instance, labeling the second training data instance generated based on the respective first training data instance with the same first label as the respective first training data instance.

In certain embodiments, training logic 750 includes logic for training an ML model for sentence-level profanity classification and token-level profanity classification using a loss function comprising a regularization term configured to increase loss based on disagreement between a sentence-level profanity classification and a token-level profanity classification generated for a same input sentence.

In certain embodiments, providing logic 752 includes logic for providing the plurality of tokens of the respective training data instance to an input layer of the ML model.

In certain embodiments, receiving logic 754 includes logic for receiving a first output for each of the plurality of tokens of the respective training data instance classifying the respective token as a profanity-containing token or a non-profanity-containing token. In certain embodiments, receiving logic 754 includes logic for receiving a second output for the respective training data instance classifying the respective training data instance as a profanity-containing instance or a non-profanity-containing instance. In certain embodiments, receiving logic 754 includes logic for receiving an input sentence comprising a plurality of tokens.

In certain embodiments, determining logic 756 includes logic for determining a loss value based on the first output for each of the plurality of tokens and the second output using a loss function comprising a regularization term configured to increase loss based on disagreement between the first output for each of the plurality of tokens and the second output. In certain embodiments, determining logic 756 includes logic for determining that each of the one or more tokens are not included in a list of known profanity tokens, wherein the list of known profanity tokens comprises a plurality of profanity tokens in two or more languages. In certain embodiments, determining logic 756 includes logic for determining that each of the one or more tokens are included in a list of known profanity words, wherein the list of known profanity tokens comprises a plurality of profanity tokens in two or more languages. In certain embodiments, determining logic 756 includes logic for determining whether the first label associated with the training data instance comprising the respective token is the profanity-containing instance label or the non-profanity-containing instance label. In certain embodiments, determining logic 756 includes logic for determining the second classification output for at least one token of the plurality of tokens comprises the profanity-containing token classification.

In certain embodiments, modifying logic 758 includes logic for modifying one or more parameters of the ML model based on the loss value.

In certain embodiments, obtaining logic 760 includes logic for obtaining a first set of first training data instances in a first language.

In certain embodiments, processing logic 762 includes logic for processing, with a machine learning (ML) model trained for sentence-level profanity classification and token-level profanity classification using a loss function comprising a regularization term configured to increase loss based on disagreement between a sentence-level profanity classification and a token-level profanity classification generated for a same input sentence, the input sentence comprising the plurality of tokens and thereby generating: a first classification output for the input sentence, the first classification output comprising a profanity-containing sentence classification or a non-profanity-containing sentence classification; and a second classification output for each of the plurality of tokens of the input sentence, the second classification output comprising a profanity-containing token classification or a non-profanity-containing token classification.

In certain embodiments, using logic 764 includes logic for using the input sentence comprising the at least one masked token to perform one or more tasks.

In certain embodiments, generating logic 766 includes logic for, for each first training data instance in the first set of first training data instances, generating, via machine translation, a second training data instance to create a second set of second training data instances in a second language, wherein the plurality of training data instances comprises the first set of first training data instances and the second set of second training data instances.

In certain embodiments, concealing logic 768 includes logic for concealing at least one profanity-containing token in a plurality of tokens.

Note that FIG. 7 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A method of training a machine learning (ML) model to detect profanity, comprising: labeling each of a plurality of training data instances with a first label, the first label comprising a profanity-containing instance label or a non-profanity-containing instance label; labeling each token of a plurality of tokens for each of the plurality of training data instances with a second label, the second label comprising a profanity-containing token label or a non-profanity-containing token label; training the ML model by, for each training data instance of the plurality of training data instances: providing the plurality of tokens of the respective training data instance to an input layer of the ML model; receiving a first output for each of the plurality of tokens of the respective training data instance classifying the respective token as a profanity-containing token or a non-profanity-containing token; receiving a second output for the respective training data instance classifying the respective training data instance as a profanity-containing instance or a non-profanity-containing instance; determining a loss value based on the first output for each of the plurality of tokens and the second output using a loss function comprising a regularization term configured to increase loss based on disagreement between the first output for each of the plurality of tokens and the second output; and modifying one or more parameters of the ML model based on the loss value.

Clause 2: The method of Clause 1, wherein labeling each token of the plurality of tokens for each of the plurality of training data instances with a second label comprises, for one or more tokens of the plurality of tokens: determining that each of the one or more tokens are not included in a list of known profanity tokens, wherein the list of known profanity tokens comprises a plurality of profanity tokens in two or more languages; and based on each of the one or more tokens not being included in the list of known profanity tokens, labeling each of the one or more tokens with the non-profanity-containing token label.

Clause 3: The method of any one of Clauses 1-2, wherein labeling each token of the plurality of tokens for each of the plurality of training data instances with a second label comprises, for one or more tokens of the plurality of tokens: determining that each of the one or more tokens are included in a list of known profanity words, wherein the list of known profanity tokens comprises a plurality of profanity tokens in two or more languages; based on each of the one or more tokens being included in the list of known profanity words, for each respective token of the one or more tokens: determining whether the first label associated with the training data instance comprising the respective token is the profanity-containing instance label or the non-profanity-containing instance label; when the first label associated with the training data instance comprising the respective token is the profanity-containing instance label, labeling the respective token with the profanity-containing token label; and when the first label associated with the training data instance comprising the respective token is the non-profanity-containing instance label, labeling the token with the non-profanity-containing token label.

Clause 4: The method of any one of Clauses 1-3, further comprising: obtaining a first set of first training data instances in a first language; and for each first training data instance in the first set of first training data instances, generating, via machine translation, a second training data instance to create a second set of second training data instances in a second language, wherein the plurality of training data instances comprises the first set of first training data instances and the second set of second training data instances.

Clause 5: The method of Clause 4, wherein labeling each of a plurality of training data instances with the first label comprises: labeling each of the first set of the first training data instances with the first label; and for each respective first training data instance, labeling the second training data instance generated based on the respective first training data instance with the same first label as the respective first training data instance.

Clause 6: The method of any one of Clauses 1-5, wherein, for each training data instance of the plurality of training data instances, receiving the first output for each of the plurality of tokens of the respective training data instance comprises receiving the first output for each of the plurality of tokens as a sequence of tokens.

Clause 7: The method of any one of Clauses 1-6, wherein the ML model comprises an encoder only transformer architecture.

Clause 8: The method of any one of Clauses 1-7, wherein the encoder only transformer architecture comprises a decoding-enhanced bidirectional encoder representations from transformers with disentangled attention (DeBERTa) model.

Clause 9: A method of profanity detection, comprising: receiving a first input sentence comprising a first plurality of tokens; and processing, with a machine learning (ML) model trained for sentence-level profanity classification and token-level profanity classification using a loss function comprising a regularization term configured to increase loss based on disagreement between a sentence-level profanity classification and a token-level profanity classification generated for a same input sentence, the first input sentence comprising the first plurality of tokens and thereby generating a first classification output for the first input sentence, the first classification output comprising a profanity-containing sentence classification; determining the first classification output for the first input sentence comprises the profanity-containing sentence classification; and based on the determination, processing with the ML model the first input sentence comprising the plurality of tokens and thereby generating a second classification output for each of the first plurality of tokens of the first input sentence, wherein the second classification output generated for at least one token of the first plurality of tokens comprises a profanity-containing token classification.

Clause 10: The method of Clause 9, further comprising: concealing the at least one token in the first input sentence; and using the first input sentence comprising the at least one concealed token to perform one or more tasks.

Clause 11: The method of any one of Clauses 9-10, further comprising training the ML model for the sentence-level profanity classification and the token-level profanity classification using a plurality of training data instances, wherein training the ML model comprises, for each training data instance of the plurality of training data instances: providing a plurality of tokens of the respective training data instance to an input layer of the ML model; receiving a first output for each of the plurality of tokens of the respective training data instance classifying the respective token as a profanity-containing token or a non-profanity-containing token; receiving a second output for the respective training data instance classifying the respective training data instance as a profanity-containing instance or a non-profanity-containing instance; determining a loss value based on the first output for each of the plurality of tokens and the second output using the loss function comprising the regularization term; and modifying one or more parameters of the ML model based on the loss value.

Clause 12: The method of Clause 11, further comprising, prior to training the ML model: labeling each of the plurality of training data instances with a first label, the first label comprising a profanity-containing instance label or a non-profanity-containing instance label; and labeling each token of a plurality of tokens for each of the plurality of training data instances with a second label, the second label comprising a profanity-containing token label or a non-profanity-containing token label.

Clause 13: The method of Clause 12, wherein labeling each token of the plurality of tokens for each of the plurality of training data instances with a second label comprises, for one or more tokens of the plurality of tokens: determining that each of the one or more tokens are not included in a list of known profanity tokens, wherein the list of known profanity tokens comprises a plurality of profanity tokens in two or more languages; and based on each of the one or more tokens not being included in the list of known profanity tokens, labeling each of the one or more tokens with the non-profanity-containing token label.

Clause 14: The method of any one of Clauses 12-13, wherein labeling each token of the plurality of tokens for each of the plurality of training data instances with a second label comprises, for one or more tokens of the plurality of tokens: determining that each of the one or more tokens are included in a list of known profanity words, wherein the list of known profanity tokens comprises a plurality of profanity tokens in two or more languages; based on each of the one or more tokens being included in the list of known profanity words, for each respective token of the one or more tokens: determining whether the first label associated with the training data instance comprising the respective token is the profanity-containing instance label or the non-profanity-containing instance label; when the first label associated with the training data instance comprising the respective token is the profanity-containing instance label, labeling the respective token with the profanity-containing token label; and when the first label associated with the training data instance comprising the respective token is the non-profanity-containing instance label, labeling the token with the non-profanity-containing token label.

Clause 15: The method of any one of Clauses 12-14, further comprising, prior to training the ML model: obtaining a first set of first training data instances in a first language; and for each first training data instance in the first set of first training data instances, generating, via machine translation, a second training data instance to create a second set of second training data instances in a second language, wherein the plurality of training data instances comprises the first set of first training data instances and the second set of second training data instances.

Clause 16: The method of Clause 15, wherein labeling each of a plurality of training data instances with the first label comprises: labeling each of the first set of the first training data instances with the first label; and for each respective first training data instance, labeling the second training data instance generated based on the respective first training data instance with the same first label as the respective first training data instance.

Clause 17: The method of any one of Clauses 11-16, wherein, for each training data instance of the plurality of training data instances, receiving the first output for each of the plurality of tokens of the respective training data instance comprises receiving the first output for each of the plurality of tokens as a sequence of tokens.

Clause 18: The method of any one of Clauses 9-17, wherein the ML model comprises an encoder only transformer architecture.

Clause 19: The method of Clause 18, wherein the encoder only transformer architecture comprises a decoding-enhanced bidirectional encoder representations from transformers with disentangled attention (DeBERTa) model.

Clause 20: The method of any one of Clauses 9-19, further comprising: receiving a second input sentence comprising a second plurality of tokens; processing, with the ML model, the second input sentence comprising the second plurality of tokens and thereby generating a third classification output for the second input sentence, the third classification output comprising a non-profanity-containing sentence classification; determining the third classification output for the second input sentence comprises the non-profanity-containing sentence classification; and based on the determination, using the second input sentence to perform one or more tasks.

Clause 21: A processing system, comprising: one or more memories comprising computer-executable instructions; and one or more processors configured to execute the computer-executable instructions and cause the processing system to perform a method in accordance with any one of Clauses 1-20.

Clause 22: A processing system, comprising means for performing a method in accordance with any one of Clauses 1-20.

Clause 23: A non-transitory computer-readable medium storing program code for causing a processing system to perform the steps of any one of Clauses 1-20.

Clause 24: A computer program product embodied on a computer-readable storage medium comprising code for performing a method in accordance with any one of Clauses 1-20.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of training a machine learning (ML) model to detect profanity, comprising:
labeling each of a plurality of training data instances with a first label, the first label comprising a profanity-containing instance label or a non-profanity-containing instance label;
labeling each token of a plurality of tokens for each of the plurality of training data instances with a second label, the second label comprising a profanity-containing token label or a non-profanity-containing token label; and
training the ML model by, for each respective training data instance of the plurality of training data instances:
providing the plurality of tokens of the respective training data instance to an input layer of the ML model;
receiving a first output for each of the plurality of tokens of the respective training data instance classifying a respective token as a profanity-containing token or a non-profanity-containing token;
receiving a second output for the respective training data instance classifying the respective training data instance as a profanity-containing instance or a non-profanity-containing instance;
determining a loss value based on the first output for each of the plurality of tokens and the second output using a loss function comprising a regularization term configured to increase loss based on disagreement between the first output for each of the plurality of tokens and the second output; and
modifying one or more parameters of the ML model based on the loss value.

2. The method of claim 1, wherein labeling each token of the plurality of tokens for each of the plurality of training data instances with a second label comprises, for one or more tokens of the plurality of tokens:
determining that each of the one or more tokens are not included in a list of known profanity tokens, wherein the list of known profanity tokens comprises a plurality of profanity tokens in two or more languages; and
based on each of the one or more tokens not being included in the list of known profanity tokens, labeling each of the one or more tokens with the non-profanity-containing token label.

3. The method of claim 1, wherein labeling each token of the plurality of tokens for each of the plurality of training data instances with a second label comprises, for one or more tokens of the plurality of tokens:
determining that each of the one or more tokens are included in a list of known profanity tokens, wherein the list of known profanity tokens comprises a plurality of profanity tokens in two or more languages; and
based on each of the one or more tokens being included in the list of known profanity tokens, for each respective token of the one or more tokens:
determining whether the first label associated with the training data instance comprising the respective token is the profanity-containing instance label or the non-profanity-containing instance label;

when the first label associated with the training data instance comprising the respective token is the profanity-containing instance label, labeling the respective token with the profanity-containing token label; and when the first label associated with the training data instance comprising the respective token is the non-profanity-containing instance label, labeling the respective token with the non-profanity-containing token label.

4. The method of claim 1, further comprising:

obtaining a first set of first training data instances in a first language; and for each first training data instance in the first set of first training data instances, generating, via machine translation, a second training data instance to create a second set of second training data instances in a second language, wherein the plurality of training data instances comprises the first set of first training data instances and the second set of second training data instances.

5. The method of claim 4, wherein labeling each of a plurality of training data instances with the first label comprises:

labeling each of the first set of first training data instances with the first label; and for each respective first training data instance, labeling the second training data instance generated based on the respective first training data instance with a same first label as the respective first training data instance.

6. The method of claim 1, wherein, for each training data instance of the plurality of training data instances, receiving the first output for each of the plurality of tokens of the respective training data instance comprises receiving the first output for each of the plurality of tokens as a sequence of tokens.

7. The method of claim 1, wherein the ML model comprises an encoder only transformer architecture.

8. The method of claim 7, wherein the encoder only transformer architecture comprises a decoding-enhanced bidirectional encoder representations from transformers with disentangled attention (DeBERTa) model.

9. A method of profanity detection, comprising:

receiving a first input sentence comprising a first plurality of tokens;

processing, with a machine learning (ML) model trained for sentence-level profanity classification and token-level profanity classification using a loss function comprising a regularization term configured to increase loss based on disagreement between a sentence-level profanity classification and a token-level profanity classification generated for a same input sentence, the first input sentence comprising the first plurality of tokens and thereby generating a first classification output for the first input sentence, the first classification output comprising a profanity-containing sentence classification;

determining the first classification output for the first input sentence comprises the profanity-containing sentence classification; and based on the determination, processing with the ML model the first input sentence comprising the first plurality of tokens and thereby generating a second classification output for each of the first plurality of tokens of the first input sentence, wherein the second classification output generated for at least one token of the first plurality of tokens comprises a profanity-containing token classification.

10. The method of claim 9, further comprising:

concealing the at least one token in the first input sentence; and using the first input sentence comprising the at least one token, which has been concealed, to perform one or more tasks.

11. The method of claim 9, further comprising:

receiving a second input sentence comprising a second plurality of tokens;

processing, with the ML model, the second input sentence comprising the second plurality of tokens and thereby generating a third classification output for the second input sentence, the third classification output comprising a non-profanity-containing sentence classification;

determining the third classification output for the second input sentence comprises the non-profanity-containing sentence classification; and based on the determination, using the second input sentence to perform one or more tasks.

12. The method of claim 9, further comprising training the ML model for the sentence-level profanity classification and the token-level profanity classification using a plurality of training data instances, wherein training the ML model comprises, for each respective training data instance of the plurality of training data instances:

providing a plurality of tokens of the respective training data instance to an input layer of the ML model;

receiving a first output for each of the plurality of tokens of the respective training data instance classifying the respective token as a profanity-containing token or a non-profanity-containing token;

receiving a second output for the respective training data instance classifying the respective training data instance as a profanity-containing instance or a non-profanity-containing instance;

determining a loss value based on the first output for each of the plurality of tokens and the second output using the loss function comprising the regularization term; and modifying one or more parameters of the ML model based on the loss value.

13. The method of claim 12, further comprising, prior to training the ML model:

labeling each of the plurality of training data instances with a first label, the first label comprising a profanity-containing instance label or a non-profanity-containing instance label; and labeling each token of a plurality of tokens for each of the plurality of training data instances with a second label, the second label comprising a profanity-containing token label or a non-profanity-containing token label.

14. The method of claim 13, wherein labeling each token of the plurality of tokens for each of the plurality of training data instances with a second label comprises, for one or more tokens of the plurality of tokens:

determining that each of the one or more tokens are not included in a list of known profanity tokens, wherein the list of known profanity tokens comprises a plurality of profanity tokens in two or more languages; and based on each of the one or more tokens not being included in the list of known profanity tokens, labeling each of the one or more tokens with the non-profanity-containing token label.

15. The method of claim 13, wherein labeling each token of the plurality of tokens for each of the plurality of training data instances with a second label comprises, for one or more tokens of the plurality of tokens:

US 12,694,210 B2

35 determining that each of the one or more tokens are included in a list of known profanity tokens, wherein the list of known profanity tokens comprises a plurality of profanity tokens in two or more languages; and based on each of the one or more tokens being included in the list of known profanity tokens, for each respective token of the one or more tokens:

determining whether the first label associated with the training data instance comprising the respective token is the profanity-containing instance label or the non-profanity-containing instance label;

when the first label associated with the training data instance comprising the respective token is the profanity-containing instance label, labeling the respective token with the profanity-containing token label; and when the first label associated with the training data instance comprising the respective token is the non-profanity-containing instance label, labeling the respective token with the non-profanity-containing token label.

16. The method of claim 13, further comprising, prior to training the ML model:

obtaining a first set of first training data instances in a first language; and for each first training data instance in the first set of first training data instances, generating, via machine translation, a second training data instance to create a second set of second training data instances in a second language, wherein the plurality of training data instances comprises the first set of first training data instances and the second set of second training data instances.

17. The method of claim 16, wherein labeling each of a plurality of training data instances with the first label comprises:

labeling each of the first set of first training data instances with the first label; and for each respective first training data instance, labeling the second training data instance generated based on the respective first training data instance with a same first label as the respective first training data instance.

18. The method of claim 9, wherein the ML model comprises an encoder only transformer architecture.

19. The method of claim 18, wherein the encoder only transformer architecture comprises a decoding-enhanced bidirectional encoder representations from transformers with disentangled attention (DeBERTa) model.

20. A processing system, comprising:

one or more memories comprising computer-executable instructions; and one or more processors configured to execute the computer-executable instructions and cause the processing system to:

label each of a plurality of training data instances with a first label, the first label comprising a profanity-containing instance label or a non-profanity-containing instance label;

label each token of a plurality of tokens for each of the plurality of training data instances with a second label, the second label comprising a profanity-containing token label or a non-profanity-containing token label; and train a machine learning (ML) model to detect profanity, wherein to train the ML model comprises to, for each respective training data instance of the plurality of training data instances:

provide the plurality of tokens of the respective training data instance to an input layer of the ML model;

receive a first output for each of the plurality of tokens of the respective training data instance classifying a respective token as a profanity-containing token or a non-profanity-containing token;

receive a second output for the respective training data instance classifying the respective training data instance as a profanity-containing instance or a non-profanity-containing instance;

determine a loss value based on the first output for each of the plurality of tokens and the second output using a loss function comprising a regularization term configured to increase loss based on disagreement between the first output for each of the plurality of tokens and the second output; and modify one or more parameters of the ML model based on the loss value.

* * * * *